US012585692B2

(12) United States Patent (10) Patent No.: US 12,585,692 B2
DiMaria et al. (45) Date of Patent: *Mar. 24, 2026

(54) STATION LIBRARY CREATION FOR A MEDIA SERVICE

(71) Applicant: Gracenote, Inc., New York, NY (US)

(72) Inventors: Peter C. DiMaria, Berkeley, CA (US);
Andrew Silverman, Berkeley, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,501

(22) Filed: Dec. 5, 2023

(65) Prior Publication Data

US 2024/0111802 A1 Apr. 4, 2024

Related U.S. Application Data

(63) Continuation of application No. 17/587,077, filed on Jan. 28, 2022, now Pat. No. 11,868,392, which is a continuation of application No. 16/135,341, filed on Sep. 19, 2018, now Pat. No. 11,269,946, which is a continuation of application No. 14/986,153, filed on Dec. 31, 2015, now Pat. No. 10,108,619, which is a (Continued)

(51) Int. Cl.
| | |
|---|---|
| *G06F 16/48* | (2019.01) |
| *H04L 65/612* | (2022.01) |
| *H04N 21/81* | (2011.01) |
| *H04N 21/84* | (2011.01) |
| *H04N 21/854* | (2011.01) |

(52) U.S. Cl.
CPC ............ *G06F 16/48* (2019.01); *H04L 65/612* (2022.05); *H04N 21/8113* (2013.01); *H04N 21/812* (2013.01); *H04N 21/84* (2013.01); *H04N 21/854* (2013.01)

(58) Field of Classification Search
CPC ... G06F 16/48; H04L 65/612; H04N 21/8113; H04N 21/812; H04N 21/84; H04N 21/854
See application file for complete search history.

(56) References Cited

U.S. PATENT DOCUMENTS

| | | | |
|---|---|---|---|
| 6,632,992 B2 | 10/2003 | Hasegawa | |
| 2004/0002310 A1* | 1/2004 | Herley | .................... H04H 60/47 |
| | | | 455/180.1 |
| 2005/0160459 A1 | 7/2005 | Mashimo | |

(Continued)

*Primary Examiner* — Jensen Hu
(74) *Attorney, Agent, or Firm* — Mcdonnell Boehnen Hulbert & Berghoff LLP

(57) ABSTRACT

A machine may form all or part of a network-based system configured to provide media service to one or more user devices. The machine may be configured to define a station library within a larger collection of media files. In particular, the machine may access metadata that describes a seed that forms the basis on which the station library is to be defined. The machine may determine a genre composition for the station library based on the metadata. The machine may generate a list of media files from the metadata based on a relevance of each media file to the station library. The machine may determine the relevance of each media file based on a similarity of the media file to the genre composition of the station library as well as a comparison of metadata describing the media file to the accessed metadata that describes the seed.

20 Claims, 17 Drawing Sheets

Related U.S. Application Data continuation-in-part of application No. 14/135,173, filed on Dec. 19, 2013, now abandoned.

(56)                References Cited

U.S. PATENT DOCUMENTS

| | | | |
|---|---|---|---|
| 2006/0173974 A1* | 8/2006 | Tang | H04L 63/08 |
| | | | 709/225 |
| 2006/0212442 A1* | 9/2006 | Conrad | G06F 16/433 |
| | | | 707/999.005 |
| 2006/0242106 A1* | 10/2006 | Bank | H04L 67/06 |
| 2007/0078714 A1 | 4/2007 | Ott | |
| 2008/0021577 A1 | 1/2008 | Ijichi | |
| 2008/0172293 A1 | 7/2008 | Raskin | |
| 2008/0222546 A1 | 9/2008 | Mudd | |
| 2009/0216622 A1 | 8/2009 | Hoashi | |
| 2010/0010997 A1* | 1/2010 | Amidon | G11B 27/034 |
| | | | 707/E17.002 |
| 2010/0076983 A1 | 3/2010 | Gates | |
| 2010/0125351 A1 | 5/2010 | Davydov | |
| 2011/0093337 A1* | 4/2011 | Granit | G06Q 30/0255 |
| | | | 705/14.66 |
| 2011/0154198 A1 | 6/2011 | Bachman | |
| 2012/0215935 A1 | 8/2012 | Woods | |
| 2012/0227115 A1 | 9/2012 | Kidron | |
| 2013/0179439 A1 | 7/2013 | Handman | |
| 2013/0318114 A1 | 11/2013 | Emerson, III | |
| 2014/0379436 A1 | 12/2014 | White | |

* cited by examiner

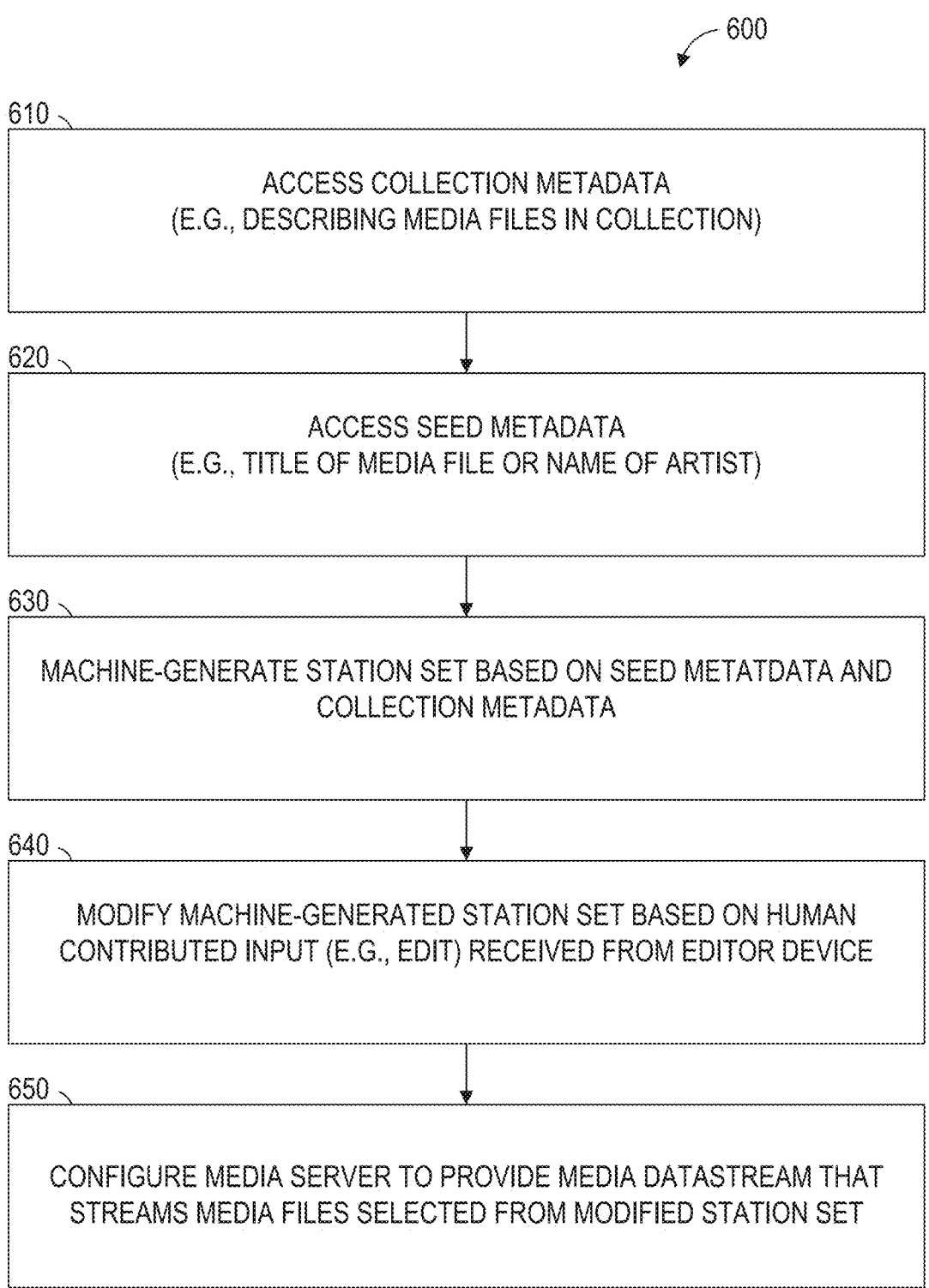

600

610
ACCESS COLLECTION METADATA
(E.G., DESCRIBING MEDIA FILES IN COLLECTION)

620
ACCESS SEED METADATA
(E.G., TITLE OF MEDIA FILE OR NAME OF ARTIST)

630
MACHINE-GENERATE STATION SET BASED ON SEED METATDATA AND
COLLECTION METADATA

640
MODIFY MACHINE-GENERATED STATION SET BASED ON HUMAN
CONTRIBUTED INPUT (E.G., EDIT) RECEIVED FROM EDITOR DEVICE

650
CONFIGURE MEDIA SERVER TO PROVIDE MEDIA DATASTREAM THAT
STREAMS MEDIA FILES SELECTED FROM MODIFIED STATION SET

1310 — GENERATE STATION DESCRIPTOR PROFILE

1320 — GENERATE CANDIDATE SET

1330 — COMPUTE SIMILARITY SCORES

1340 — COMPUTE BOOST VALUES

1350 — DETERMINE REGIONAL POPULARITY VALUES

1360 — DETERMINE RELEVANCY SCORES

1370 — SELECT STATION SET

1310

1320

1330

1340

1350

1360

1370

1300

1541
COMPUTE LANGUAGE BOOST VALUE

1542
COMPUTE RELATED ARTIST BOOST VALUE

1543
COMPUTE RECENCY BOOST VALUE

1544
COMPUTE CO-OCCURANCE BOOST VALUE

1545
COMPUTE USAGE BOOST VALUE

STATION LIBRARY CREATION FOR A MEDIA SERVICE

RELATED APPLICATIONS

The present application is a Continuation of U.S. patent application Ser. No. 17/587,077, filed Jan. 28, 2022, which is a Continuation of U.S. patent application Ser. No. 16/135,341, filed Sep. 19, 2018, which is a Continuation of U.S. patent application Ser. No. 14/986,153, filed on Dec. 31, 2015, which is a Continuation-in-Part of U.S. patent application Ser. No. 14/135,173, filed on Dec. 19, 2013, the contents of these applications being incorporated entirely herein by reference.

TECHNICAL FIELD

The subject matter disclosed herein generally relates to the processing of data. Specifically, the present disclosure addresses systems and methods to facilitate one or more media services.

BACKGROUND

A media service may be provided to one or more user devices by a media server or a group (e.g., cloud) of media servers. A media server may be or include a machine configured to provide one or more user devices with a datastream that communicates (e.g., streams) a set of one or more media files. For example, such media files may represent prerecorded music (e.g., songs), in which case such a datastream may be described as a network radio service (e.g., Internet radio service). As another example, such media files may represent prerecorded video (e.g., shows or clips) and may be described as a network video service (e.g., Internet television service). In various situations, such media files may include one or more advertisements (e.g., stored as audio files or video files).

BRIEF DESCRIPTION OF THE DRAWINGS

Some embodiments are illustrated by way of example and not limitation in the figures of the accompanying drawings.

FIGS. 6-10 are flowcharts illustrating operations of the media server machine in performing a method of providing the media service, according to some example embodiments.

DETAILED DESCRIPTION

Figure 1:
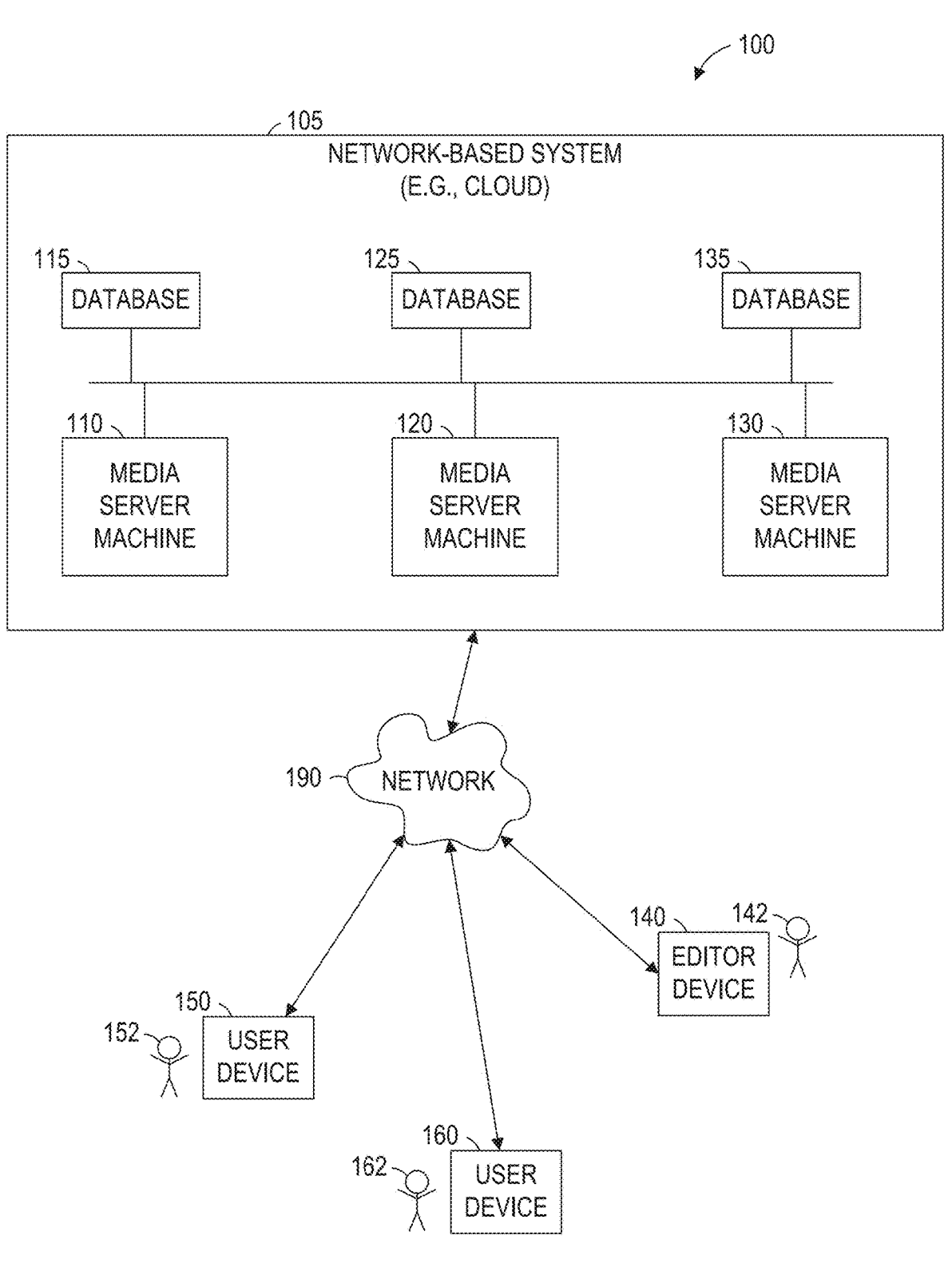
FIG. 1 is a network diagram illustrating a network environment suitable for providing a media service, according to some example embodiments.

Example methods and systems are directed to facilitating provision of a media service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a media server machine) may form all or part of a network-based system (e.g., a cloud-based system) configured to provide media service to one or more user devices. The machine may be configured (e.g., by suitable software modules) to define a station library within a larger collection of media files. In particular, the machine may access metadata (e.g., collection metadata) that describes the media files included in the collection, and the machine may access a seed (e.g., seed metadata) that forms the basis on which the station library is to be defined. The machine may generate (e.g., machine-generate) a set of media files (e.g., station set or station list that defines the station library) from the metadata and based on the seed (e.g., a song, an artist, a genre, a mood, or an era) and enable a human editor to modify the machine-generated set according to a human-contributed input (e.g., an edit or other contribution) to the set (e.g., station set or station list). For example, the machine may cause an editor device to present the editor with some or all of the set, and the machine may receive the human-contributed input (e.g., edit) from the editor device as a submission by the editor. The machine may then modify the set based on the submitted input and configure a media service to provide one or more user devices with a datastream that includes (e.g., streams) media files selected from the modified set.

In some example embodiments, the metadata that describes the collection is at least partially human-edited, and the machine may receive one or more human-edited portions of the metadata (e.g., collection metadata) from the editor device. In certain example embodiments, the machine receives one or more human-edited correlation values that indicate an extent to which two descriptors (e.g., of attributes) are correlated, and the machine may generate the list of media files (e.g., station list) based on such human-edited correlation values. In various example embodiments, the machine may configure the media service to include or exclude a media file based on its seasonality score, which may indicate a degree to which the media file is correlated with an annual calendar date.

According to some example embodiments, one or more advertisements may be selected (e.g., targeted) for inclusion or exclusion in the datastream based on metadata (e.g., ad metadata) that describes the background music of the advertisement (e.g., in contrast to foreground speech). In a cloud-based implementation, the machine may be configured to provide the datastream, as well as configure itself or another machine to store session data that indicates portions of the datastream (e.g., media files) played by a user device, and this first media server may distribute session data to each of multiple media servers in a network-based system (e.g., in the cloud). If the user device stops and restarts the receiving the datastream, the machine may configure itself or yet another machine to provide (e.g., resume) the datastream based on the distributed session data for the user device. According to certain example embodiments, prior to accessing the metadata that describes the collection, the machine generates this metadata from a superset of metadata for all available media files by identifying a best copy of the media file (e.g., a most appropriate or representative instance or copy of a recording), conforming its metadata to an aggregation of most common descriptors found in the metadata of all available copies of the media file (e.g., the most accurate descriptors available for the media file), and incorporating only the best copy of the media file into the collection of media files. Additional details are discussed below.

FIG. 1 is a network diagram illustrating a network environment 100 suitable for providing a media service, such as a network radio service, a network video service, or any suitable combination thereof, according to some example embodiments. The network environment 100 includes a network-based system 105, the editor device 140, and user devices 150 and 160, all communicatively coupled to each other via a network 190. The network-based system 105 may be a cloud-based system. As shown in FIG. 1, the network-based system 105 may contain one or more media server machines 110, 120, and 130, as well as one or more databases 115, 125, and 135, all communicatively coupled to each other within the network-based system 105. The media server machines 110, 120, and 130, the databases 115, 125, 135, the editor device 140, and the user devices 150 and 160 may each be implemented in a respective computer system, in whole or in part, as described below with respect to FIG. 11.

Also shown in FIG. 1 are an editor 142 and users 152 and 162. The editor 142 is a human user (e.g., a human being). One or both of the users 152 and 162 may be a human user (e.g., a human being), a machine user (e.g., a computer configured by a software program to interact with the user device 150 or 160), or any suitable combination thereof (e.g., a human assisted by a machine or a machine supervised by a human). The user 152 is not part of the network environment 100, but is associated with the user device 150 and may be a user of the user device 150. For example, the user device 150 may be a desktop computer, a vehicle computer, a tablet computer, a navigational device, a portable media device, or a smart phone belonging to the user 152. Likewise, the user 162 is not part of the network environment 100, but is associated with the user device 160. As an example, the user device 160 may be a desktop computer, a vehicle computer, a tablet computer, a navigational device, a portable media device, or a smart phone belonging to the user 162.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., between the media server machine 110 and the editor device 140, or between the media server machine 110 and the user device 150). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible medium that is capable of storing, encoding, or carrying instructions for execution by a machine, and includes digital or analog communication signals or other intangible media to facilitate communication of such software.

Figure 2:
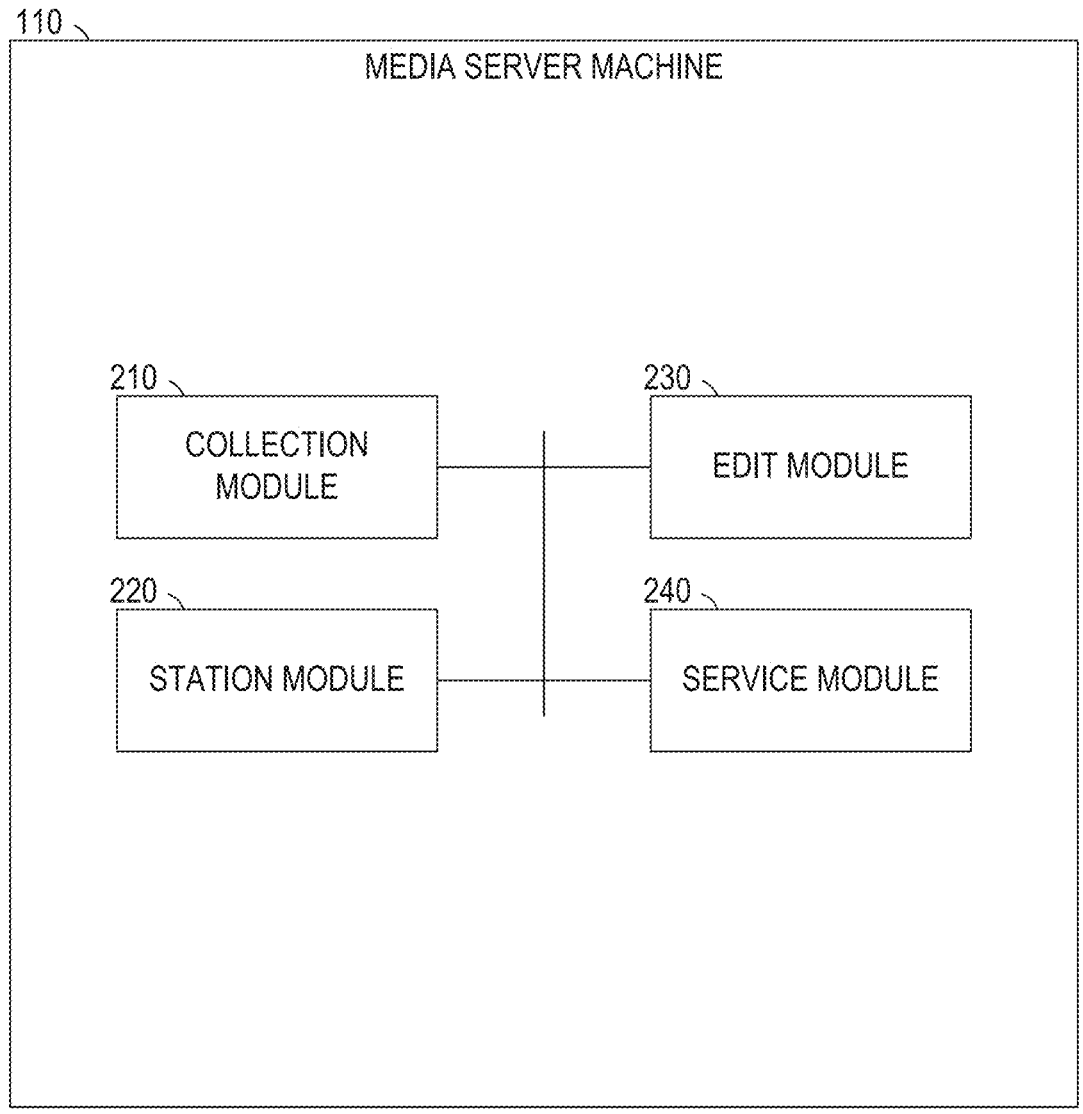
FIG. 2 is a block diagram illustrating components of a media server machine, according to some example embodiments.

FIG. 2 is a block diagram illustrating components of the media server machine 110, according to some example embodiments. The other media server machines 120 and 130 each may be similarly configured. The media server machine 110 is shown as including a collection module 210, a station module 220, an edit module 230 (e.g., an input module), and a service module 240, all configured to communicate with each other (e.g., via a bus, shared memory, or a switch). Functional details of these modules are described below with respect to FIGS. 6-10. Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
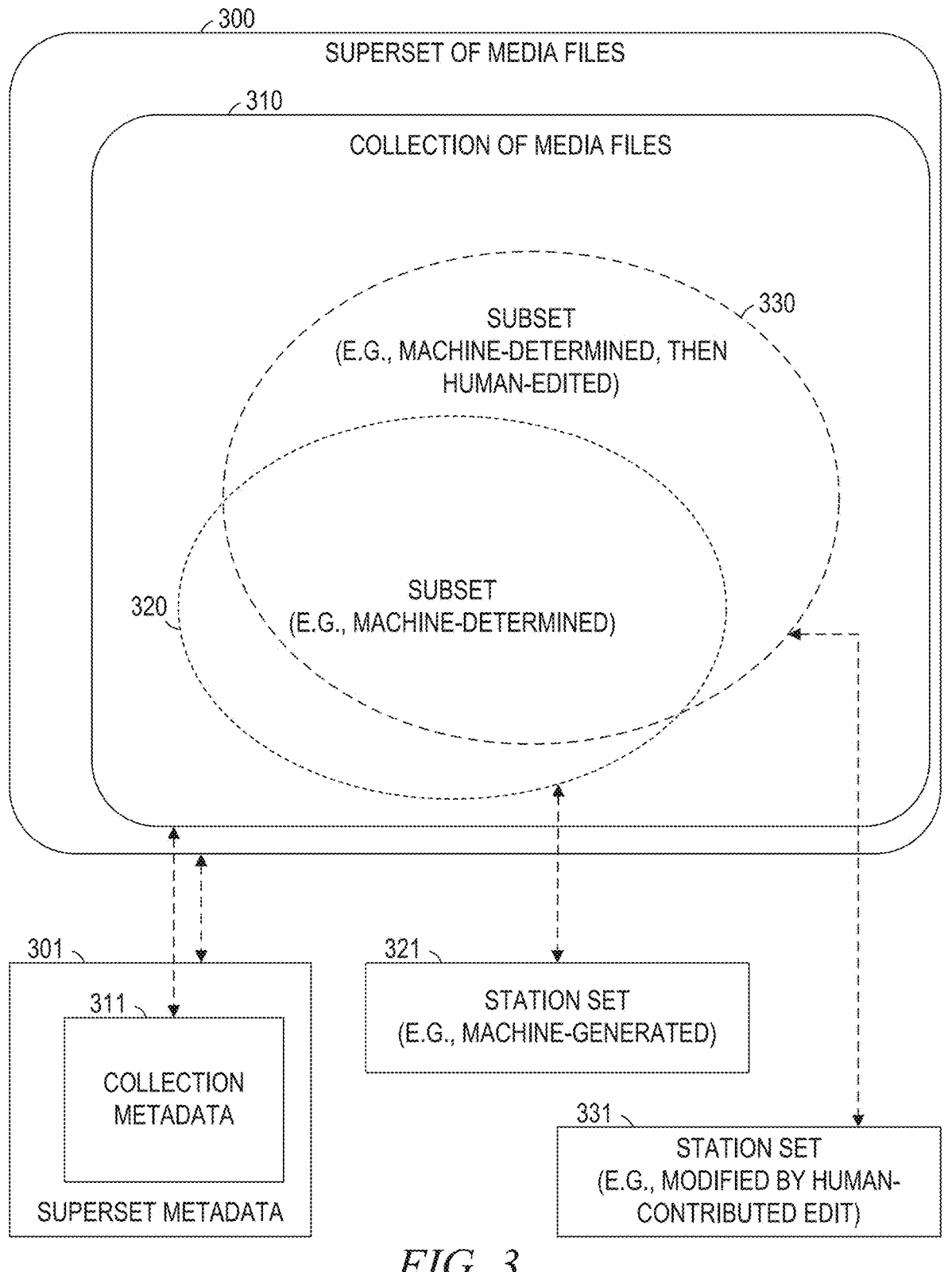
FIGS. 3 and 4 are block diagrams illustrating sets of media files made available in providing the media service, according to some example embodiments.
Figure 4:
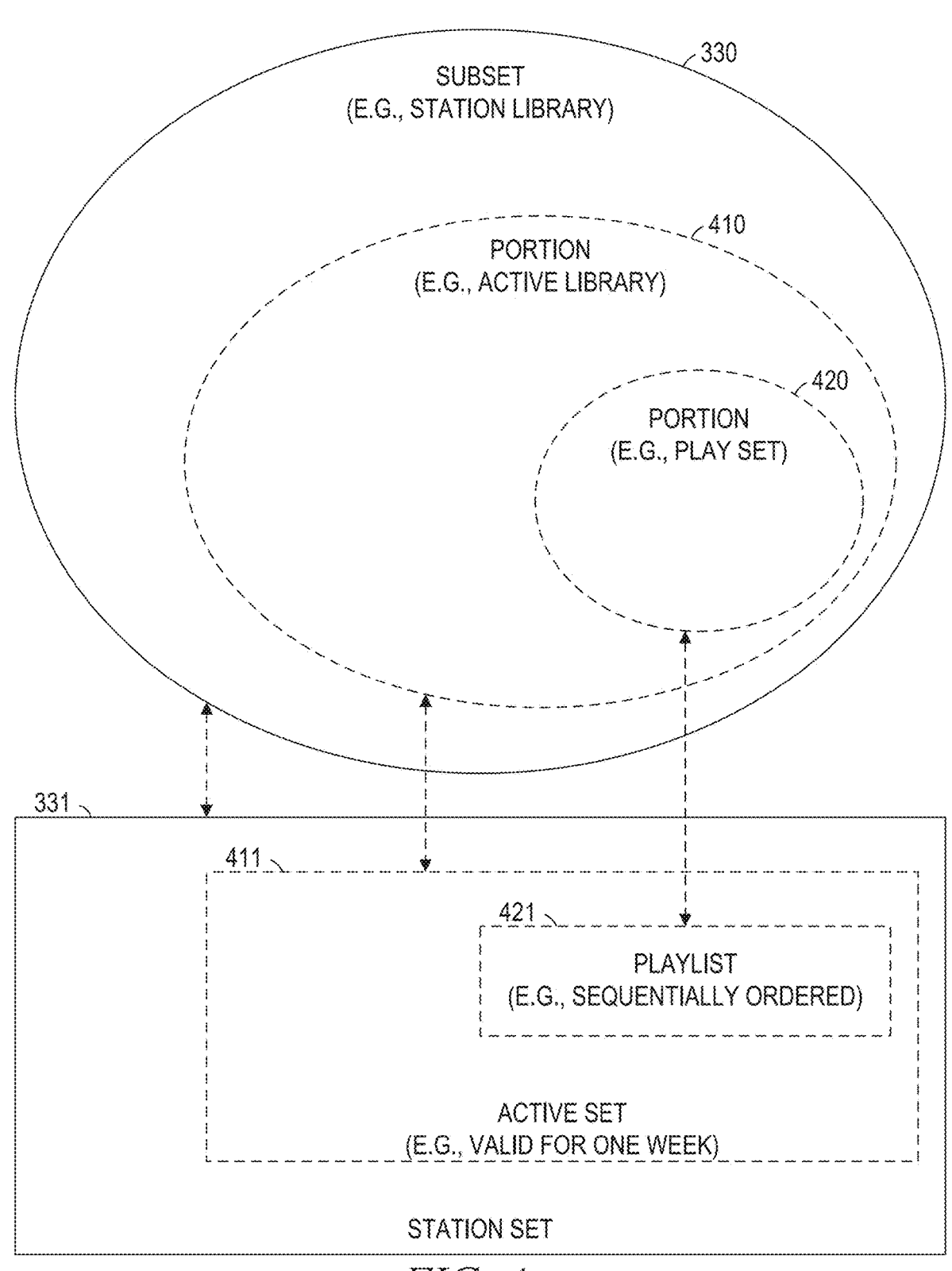

FIGS. 3 and 4 are block diagrams illustrating sets of media files in providing the media service, according to some example embodiments. As shown in FIG. 3, a superset 300 of media files may be described by superset metadata 301. The superset 300 of media files may include all media files available to the media server machine 110. The superset 300 accordingly may include media files with popularity ranging from extremely high to extremely low, media files with accurate or inaccurate metadata, media files with metadata that contain one or more stop words (e.g., "karaoke," "tribute," "demo," "alternate take," "skit," "intro," or "outro") that may form a basis for filtering out such media files from inclusion in the media service, media files that represent multiple versions of the same content (e.g., a song or a video), media files that represent multiple copies of the same recording (e.g., of a song or video), or any suitable combination thereof. The superset 300 encompasses a collection 310 of media files, which may be described by collection metadata 311, which itself may be a portion or subset of the superset metadata 301.

As shown in FIG. 3, a subset 320 (e.g., a first subset) of the collection 310 of media files may be determined (e.g., machine-determined) by the media server machine 110, and this subset 320 may be defined by a station set 321 that is generated (e.g., machine-generated) by the media server machine 110. The station set 321 may define a station library (e.g., a first version of the station library) by referencing each media file in the subset 320 of the collection 310.

As also shown in FIG. 3, a subset 330 (e.g., a second subset) of the collection 310 of media files may be determined by the media server machine 110, and this subset 330 may be defined by a station set 331 which may be a modification (e.g., a second version) of the machine-generated station set 321. Moreover, the station set 331 may be obtained by modifying the station set 321 according to a human-contributed input (e.g., submitted by the editor 142 via the editor device 140). Accordingly, the subset 330 may be both machine-determined and human-edited. The station set 331 may define a station library (e.g., a second version of the station library) by referencing each media file in the subset 330 of the collection 310.

As shown in FIG. 4, the subset 330 of the media files may form all or part of a station library (e.g., a second version of the station library) from which media files may be selected for streaming within a datastream (e.g., in providing a media service). As noted above, the subset 330 may be defined by the station set 331. FIG. 4 additionally illustrates a portion 410 of the subset 330. The portion 410 may form all or part of an active library (e.g., an active station library) that contains only a limited number of media files selected from the subset 330. As shown in FIG. 4, the portion 410 may be defined by an active set 411, which may be a subset of the station set 331. According to various example embodiments, the portion 410, the active set 411, or both, are valid only for a limited period of time (e.g., one week, two weeks, or one month).

As further shown in FIG. 4, the portion 410 of the subset 330 may itself include a portion 420 that forms all or part of a play set of media files. Such a play set may be ordered or unordered and may contain only a limited number of media files selected from the portion 410. As shown in FIG. 4, the portion 420 may be defined by a playlist 421, which may be sequentially ordered list of media files to be played according to their sequential order (e.g., by inclusion in a datastream, in accordance with their sequential order). In some example embodiments, the playlist 421 and the portion 420 may represent a default station playlist (e.g., in contrast to a personalized or customized station playlist specific to the user 152). In certain example embodiments, the same techniques described herein with respect to the playlist 421 and the portion 420 may be applied to generate a personalized or customized station playlist that are specific to a user (e.g., the user 152), and such generation of a personalized or customized station playlist may be initially based on user behavior, user feedback, user attributes that are specific to the user (e.g., user 152), as well as collective user behavior, collective user feedback, and collective user attributes shared in common by multiple users (e.g., users 152 and 162). For example, if the media file (e.g., an audio recording) exists in the personal collection of the user 152, its appearance in the playlist 421 may be emphasized or ensured for inclusion by the media service. Accordingly, the playlist 421 may be sequenced so that media files that are possessed by the user 152 appear early (e.g., high) in the playlist 421.

According to various example embodiments, the portion 420, the playlist 421, or both, are valid only for a limited period of time (e.g., one week, two weeks, or one month). Thus, the portion 420, the playlist 421, or both, may be regenerated periodically (e.g., weekly, biweekly, or monthly). Moreover, the station set 331, the active set 441, the playlist 421, or any suitable combination thereof, may reference media files found based on the seed metadata, as well as media files found in other ways (e.g., from a human-contributed input submitted by the editor 142). In addition, the station set 331, the active set 441, the playlist 421, or any suitable combination thereof, reference media files deemed (e.g., in their metadata) as appropriate for a core experience (e.g., popular or mainstream media files) or appropriate for an extended experience (e.g., less popular but representative media files, such as, "deep cuts"). Any one or more of the objects depicted in FIGS. 3 and 4 may be stored in one or more of the databases 115, 125, and 135.

Figure 5:
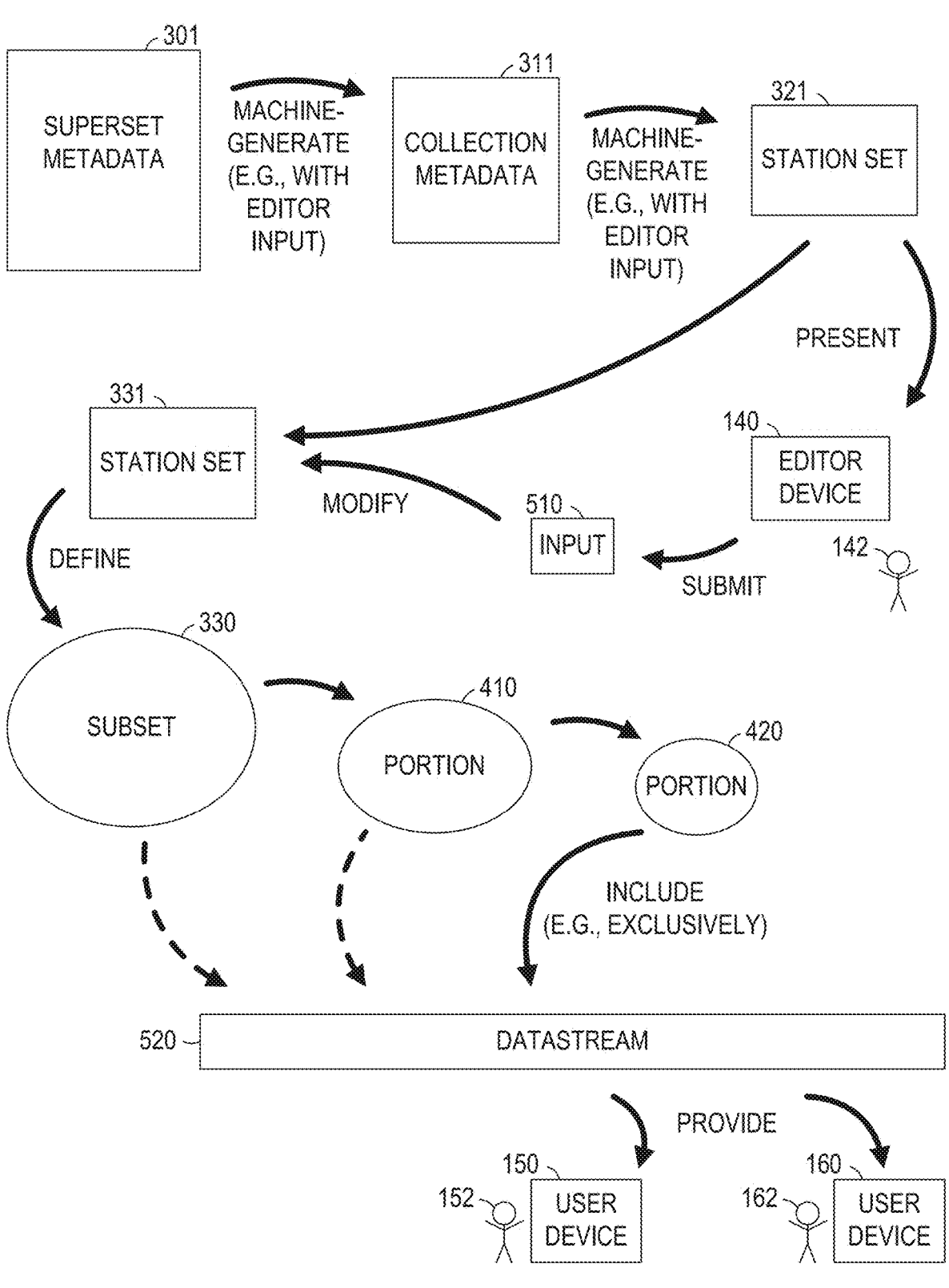
FIG. 5 is a conceptual diagram illustrating a workflow for providing the media service, according to some example embodiments.

FIG. 5 is a conceptual diagram illustrating a workflow for providing the media service, according to some example embodiments. Such a workflow may be performed by the media server machine 110. Starting from the top left corner of FIG. 5, the media server machine 110 may generate the collection metadata 311 from the superset metadata 301. In some example embodiments, the collection metadata 311 is generated using editorial input received from the editor device 140. Once the collection metadata 311 has been obtained, the media server machine 110 may generate the station set 321 from the collection metadata 311 (e.g., based on seed metadata, such as a name of the media file, name of an artist, or other seed for generating a station library from the collection 310 of media files). In certain example embodiments, the station set 321 is generated according to editorial input received from the editor device 140. Accordingly, the station set 321 is a machine-generated station set that defines a machine-determined station library as the subset 320 of the collection 310.

As shown in FIG. 5, the media server machine 110 may cause the editor device 140 to present the station set 321 to the editor 142, and the media server machine 110 may receive an input 510 from the editor device 140. The input 510 may be a human-contributed input (e.g., an edit to the station set 321) or other input that is received as a submission from the editor 142. The media server machine 110 may then modify the station set 321 based on the input 510 to obtain the station set 331. The station set 331 may thus be a human edited, machine-generated station set that defines a human-edited (e.g., human-modified) station library as the subset 330 of the collection 310.

In some example embodiments, the input 510 results in removal or de-emphasis of at least one media file from the subset 320, to obtain the subset 330. In certain example embodiments, the input 510 results in addition or emphasis of at least one media file from the subset 320, to obtain the subset 330. For example, the input 510 may specify a media file (e.g., by name, title, filename, episode, or other identifier), a group of multiple media files (e.g., by artist, composition, composer, album, actor), a descriptor of a media file (e.g., genre, mood, origin, era, live recording, various artists compilation, language, topic, setting, or scenario), an associative relationship (e.g., dissimilar artist, or inappropriate movie pair), or any suitable combination thereof. The input 510 may be submitted for a particular category (e.g., of attributes types), and different categories may be treated differently (e.g., given different weights or emphasis) in the resulting station set 331, in the subset 330, in the portion 310, in the portion 320 (e.g., given different segue patterns or sequencing patterns), or any suitable combination thereof.

Moreover, each different object type (e.g., media file type), object group type (e.g., category of media files), or object association type (e.g., associative relationship) may be assigned with editorially created weights and heuristics which may impact the degree to which items of that type are added or deemphasized in the resulting station set 321. Furthermore, the relative impact level of different types may be determined through a hierarchy of relevance, based on the specificity of the type. For example, an editorially selected individual media file (e.g., recording) or associative relationship (e.g., recording association) may have a greater impact or likelihood of presentation that media files associated with an editorially selected artist or artists association. This may have the effect of giving preferential treatment to media files that are directly selected (e.g., as a result of the input 510), in comparison to media files algorithmically identified and thus indirectly selected (e.g., as a result of the input 510).

As shown in FIG. 5, the station set 331 defines the subset 330 (e.g., station library), and the media server machine 110 may include media files selected from the subset 330 into the datastream 520, which the media server machine 110 may provide (e.g., configure itself to provide) to one or both of the user devices 150 and 160 (e.g., for presentation to the users 152 and 162). For example, the datastream 520 may only (e.g., exclusively) include media files selected from the subset 330.

In some example embodiments, the media server machine 110 (e.g., with or without further submissions received from the editor device 140) may determine the portion 410 (e.g., active library) of the subset 330. As noted above, the portion 410 may represent an active library, which may be valid for a limited period of time (e.g., one week). In such example embodiments, only media files selected from the portion 410 are selected by the media server machine 110 for inclusion in the datastream 520. In certain example embodiments, the media server machine 110 (e.g., with or without input from the editor device 140) may determine the portion 420 (e.g., play set) of the portion 410. As noted above, the portion 420 may represent a play set of media files. In such example embodiments, only media files selected from the portion 420 are selected by the media server machine 110 for inclusion in the datastream 520.

FIGS. 6-10 are flowcharts illustrating operations of the media server machine 110 in performing a method 600 of providing the media service, according to some example embodiments. Operations in the method 600 may be performed by the media server machine 110, using modules discussed above with respect to FIG. 2. As shown in FIG. 6, the method 600 includes operations 610, 620, 630, 640, and 650.

In operation 610, the collection module 210 accesses the collection metadata 311. As noted above, the collection metadata 311 describes the media files in the collection 310 of media files. The collection metadata 311 may be accessed from the database 115.

In operation 620, the station module 220 accesses seed metadata (e.g., describing a seed for defining a station library), which may be a part of the collection metadata 311. The seed metadata may be a basis for determining the subset 320 of the collection 310 of media files. Accordingly, the seed metadata may be considered as a basis on which a first subset of the collection 310 is to be defined. The seed metadata may be received from the editor device 140 (e.g., as a submission from the editor 142), or the seed metadata may be automatically determined (e.g., selected) by the station module 220. For example, the media server machine 110 may be configured to define a station library for every artist and every media file represented in the collection 310 of media files, and the station module 220 may sequentially select each artist and each media file one by one as seed metadata.

In some example embodiments, some or all of the seed metadata may be associated with one or more specified seed objects of one or more types. For example, some or all of the seed metadata may be associated with a recording, a recording artist, the composition, a composer, an applet, an episode, a movie, an actor, or any suitable combination thereof. Moreover, some or all of the seed metadata may be associated with one or more media object groups. Examples of a media object group include a human-curated recording set, a recording artist set, recording playlist, and a program set. Accordingly, the seed metadata may include attributes directly associated with the seed object, as well as indicate associative relationships among seed objects.

In certain example embodiments, the seed metadata may include directly specified attributes (e.g., genre, mood, origin, era, language, topic, setting, scenario, or any suitable combination thereof). Moreover, any one or more of such attributes may exist at any level of a corresponding attribute hierarchy. Accordingly, the specified attributes in the seed metadata may be drawn from any combination of levels of different attribute hierarchies.

In operation 630, the station module 220 generates (e.g., machine-generates) the station set 321 from the collection metadata 311 based on the seed metadata accessed in operation 620. As noted above, the station set 321 may define a station library by defining the subset 320 (e.g., a first subset) of the collection 310, referencing each media file in the subset 320, or both.

According to various example embodiments, the generation of the station set 321 may utilize any combination of associative, hierarchical, weighting, filtering, bias, and scaling data structures, and such data structures may be developed through any combination of human editorial, machine-based content analysis, supervised machine learning, unsupervised machine learning, data mining, and other data processing techniques. Moreover, the station set 321 may be generated using any combination of heuristics and algorithms, including attribute-based selection, attribute-based filtering, attribute-based emphasis, attribute-based de-emphasis, similarity (e.g., relatedness) calculations based on similarity scores (e.g., human-edited or machine-created) of media files, attributes, or any suitable combination thereof.

According to certain example embodiments, the station set 321 may be defined, in whole or in part, by one or more attributes specified as seeds (e.g., additional seed metadata). For example, the seed metadata accessed in operation 620 may include a mood (e.g., "energetic"), and the station set 321 generated in operation 630 may be defined by that mood.

According to some example embodiments, the station set 321 may be defined, in whole or in part, by one or more seed media files (e.g., seed recordings). Moreover, performance of operation 630 may incorporate into the station set 321 other media files from an album or set of albums that contain the seed media file. In some example embodiments, the station set 321 is generated based on the relative popularity of the one or more seed media files, and such relative popularity may be indicated in the superset metadata 301 (e.g., as accessed from one or more sources, which may have individually assigned confidence values or weight values). For example, each indicator type from each source may be assigned (e.g., by the editor 142) to an editorially determined set of factors (e.g., bias, scaling, step factors, minimum constraints, maximum constraints, or any suitable combination thereof) to enable normalized integration of the values of indicator types from a given source into the superset 301 (e.g., for determining the relative popularity of one or more seed media files).

In some example embodiments, the station set 321 is defined by the relative popularity of all of the other (e.g., non-seed) "candidate" items in the collection 310 of media files. For example, when selecting which media files to include in the station set 321, those media files that are more popular than others, all other descriptors being equal (e.g., in terms of similarity), may be selected. Moreover, popularity of a seed media file (e.g., corresponding to the seed metadata) may be used to influence the content of the station set 321. For example, highly popular seed media files may be accorded additional emphasis or priority compared to other highly popular media files in the station set 321. On the other hand, if the seed media file is obscure (e.g., a "long tail" media file), such emphasis or priority may be removed, and the station set 321 may accordingly include other obscure media files (e.g., other "long tail" media files, and even "longer tail" media files). This may have the effect of conforming the station set 321 to the playlist expectations of a mainstream user (e.g., user 152) in selecting the popular seed media file, for example, as compared to an aficionado user (e.g., user 162) intentionally selecting an obscure seed media file.

In various example embodiments, the station set 321 may be divided (e.g., during its generation) into two or more groups, based on whether the datastream 520 is to be provided as a default station datastream or a personalized station datastream (e.g., customized for the user 152 based on user preferences, the seed metadata, or both). For example, the station set 321 may be divided into two groups: one which contains popular media files strongly associated with the seed metadata (e.g., recording artist), and another which contains less familiar media files less strongly associated with the seed metadata. The relative proportion of these two groups may be editorially controlled (e.g., at a global level, or for individual station playlists), by the editor 142, by end users (e.g., user 152, via preferences or explicit commands), or any suitable combination thereof.

Moreover, the station set 321 may be divided into two or more rotation category groups, which may be utilized to generate one or more station playlists. In such example embodiments, allocation of media files from the station set 321 into a rotation category group may be based on any factor, including similarity to the seed metadata, popularity, specific attributes, editorial assignment, or any suitable combination thereof. As a further example, a media file may be allocated into a rotation category group based on one or more editorially created, tunable constraint rules (e.g., maximum number of media files by the same recording artist, maximum number of media files of a given genre, minimum number of media files from a given year, or any suitable combination thereof).

In certain example embodiments, the seed metadata references multiple media files. In such example embodiments, the station set 321 may be generated with emphasis on media items that are most relevant to descriptors (e.g., values of attributes) that are shared in common, or highly similar, between two or more of the multiple media files referenced in the seed metadata.

In operation 640, the edit module 230 modifies the machine-generated station set 321 to obtain the station set 331. The modifying of the machine-generated station set 321 may be based on the human-contributed input 510, which may be received by the edit module 230 from the editor device 140. As noted above, the modified station set 331 may modify the station library defined in operation 630. In particular, the modified station set 331 may modify the station library by defining the subset 330 (e.g., a second subset) of the collection 310, referencing each media file in the subset 330, or both.

The station set 331 may additionally enhance the station set 321 through additional editorial input (e.g., received from the editor device 140) in the form of subjectively determined additional filters, extensions, and weightings (e.g., penalties or boosts) of other attributes or media files based on a specified set of one or more input attributes. Such subjectively determine filters may also be determined by particular combinations of specified attribute seeds (e.g., additional seed metadata).

In operation 650, the service module 240 configures the media server machine 110 to provide the datastream 520 to one or more of the user devices 150 and 160 (e.g., for presentation to the users 152 and 162). The service module 240 may configure a media service that is executing on the media server machine 110, and the configured media service may provide the datastream 520 to the user devices 150 and 160. As noted above, the datastream 520 may be a media datastream that includes (e.g., streams, contains, broadcasts, multicasts, or plays) media files selected from the subset 330 (e.g., the second subset) of the collection 310. In some example embodiments, the datastream 520 is defined (e.g., exclusively) by the subset 330 of the collection 310. Accordingly, the subset 330 may be considered as a modified station library (e.g., a human-edited station library) from which media files may be selected for inclusion in the datastream 520.

Figure 7:
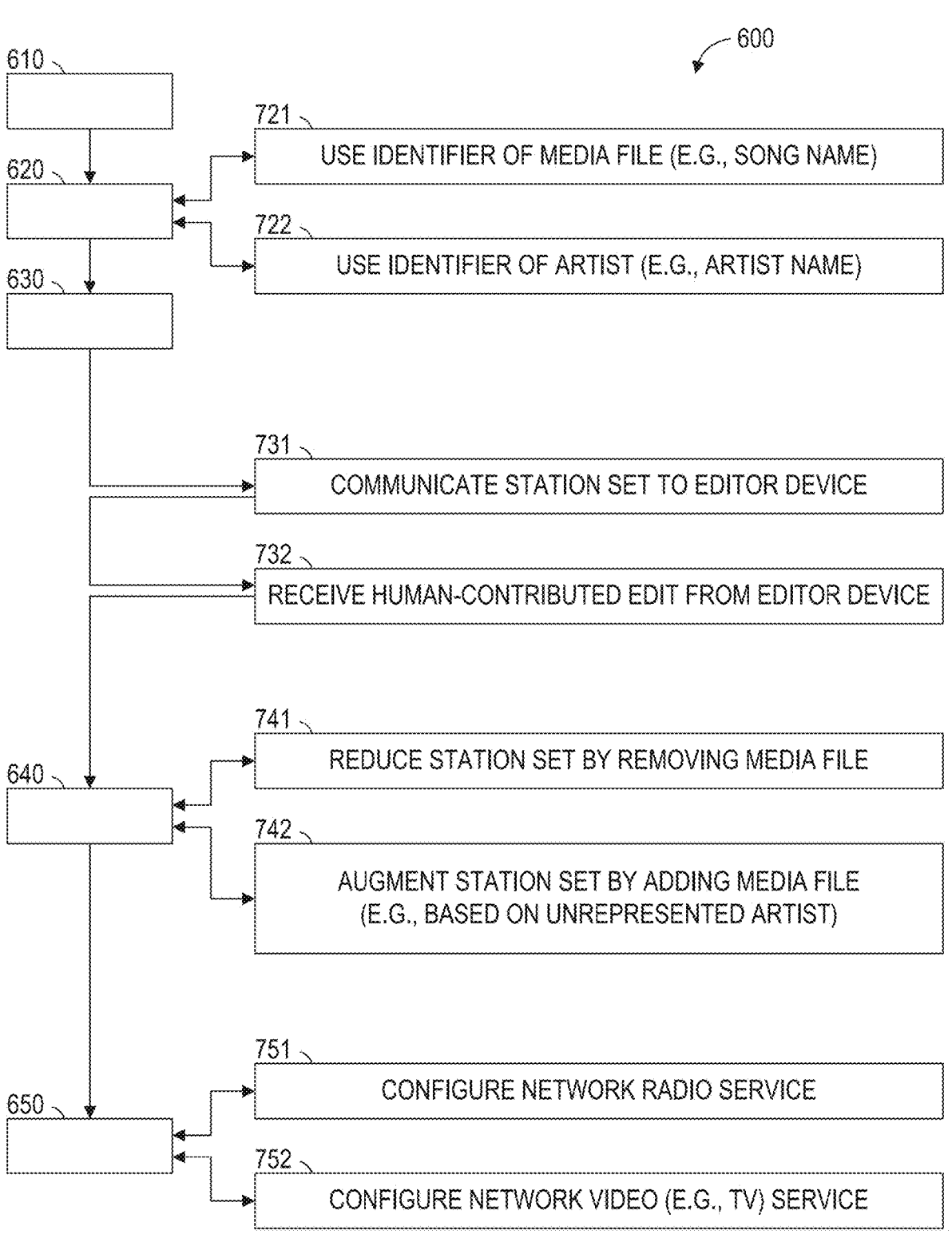

As shown in FIG. 7, the method 600 may include one or more of operations 721, 722, 731, 732, 741, 742, 751, and 752. In some example embodiments, operation 721 may be performed as part (e.g., a precursor task, a subroutine, or a portion) of operation 620, in which the station module 220 accesses the seed metadata. In operation 721, the seed metadata is or includes an identifier of a media file. Examples of such an identifier include a title of the media file (e.g., a song name), a file name of the media file, a uniform resource identifier (URI) of the media file, and a uniform resource locator (URL) of the media file. In alternative example embodiments, operation 722 may be performed as part of operation 620. In operation 722, the seed metadata is or includes an identifier of an artist (e.g., an artist that authored, produced, or otherwise created a media file). For example, such identifier may be or include a name of the artist (e.g., a singer, a band, a disc jockey, or other performer that recorded a media file).

As shown in FIG. 7, operations 731 and 732 may be performed after operation 630, in which the station module 220 may machine-generate the station set 321. In operation 731, the edit module 230 communicates the machine-generated station set 321 to the editor device 140, which may be configured (e.g., by suitable software) to present at least part of the station set 321 to the editor 142. As part of operation 731, the edit module 230 may cause the editor device 140 to present at least part of the station set 321 to the editor 142.

In some example embodiments, additional information (e.g., additional data elements) are communicated and presented as well in operation 731. For example, such additional information may include a set of one or more candidate media files or candidate attributes which have been determined (e.g., based on a machine calculation) using a combination of machine-generated data mining and human input (e.g., from the editor 142, the user 152, or both). This may enable the editor 142 to facilitate generation of a human-curated set of validated weighted media files, weighted attribute assignments, weighted associative relationships of different types, or any suitable combination thereof (e.g., As discussed above with respect to operation 640).

In operation 732, the edit module 230 receives the human-contributed input 510 of the station set 321 from the editor device 140. As noted above, the input 510 may be received as a submission from the human editor 142. According to various example embodiments, the input 510 may include one or more individual modifications (e.g., additions or removals of references to the media files) to be applied to the station set 321 to obtain the modified station set 331.

As shown in FIG. 7, one or more of operations 741 and 742 may be performed as part of operation 640, in which the edit module 230 modifies the station set 321 to obtain the modified station set 331. In some example embodiments, the human-contributed input 510 results in (e.g., by specifying) removal or de-emphasis of one or more media files from the subset 320 (e.g., the first subset) of the collection 310 to create the subset 330 (e.g., the second subset) of the collection 310. Accordingly, in operation 741, the edit module 230 reduces the station set 321 by removing references to the specified one or more media files in generating the modified station set 331. In certain example embodiments, the human-contributed input 510 results in (e.g., by specifying) addition of one or more media files from the subset 320 (e.g., the first subset) to create the subset 330 (e.g., the second subset). Accordingly, in operation 742, the edit module 230 augments the station set 321 by adding references to the specified one or more media files in generating the modified station set 331.

Furthermore, the input 510 may specify the one or more media files by specifying an artist that is unrepresented in the subset 320 (e.g., the first subset) of the collection 310. Hence, the human-contributed input 510 may result in that artist being represented in the subset 330 (e.g., the second subset) of the collection 310. Moreover, in some example embodiments, the editor device 140 is configured to enable the editor 142 to custom-program and persistently managed an individualized station set (e.g., station set 331) which may be thematic, experiential, activity-oriented, or any suitable combination thereof. Such a station set may be individualized by defining multiple configuration elements, such as, seed objects (e.g., additional seed metadata), attribute inclusion rules, attribute exclusion rules, similarity thresholds for one or more attributes, weightings (e.g., levels of influence) for one or more attributes, or any suitable combination thereof.

As shown in FIG. 7, one or both of operations 751 and 752 may be performed as part of operation 650, in which the service module 240 configures the media server machine 110 to provide the datastream 520 to one or more of the user devices 150 and 160. In some example embodiments, the collection 310 of media files includes audio files (e.g., song files, or other audio files, such as, comedy tracks, short stories, podcasts, or sound effects). Accordingly, in operation 751, the service module 240 may configure a network radio service (e.g., Internet radio) that selects song files from the subset 330 (e.g., the station library, as modified in operation 640) and streams the selected song files to one or more of the user devices 150 and 160. In certain example embodiments, the collection 310 of media files includes video files (e.g., movies, television episodes, music videos, webisodes, or video podcasts). Accordingly, in operation 752, the service module 240 may configure a network video (e.g., television) service (e.g., Internet video service) that selects video files from the subset 330 (e.g., the station library, as modified in operation 640) and streams the selected video files to one or more of the user devices 150 and 160.

Figure 8:
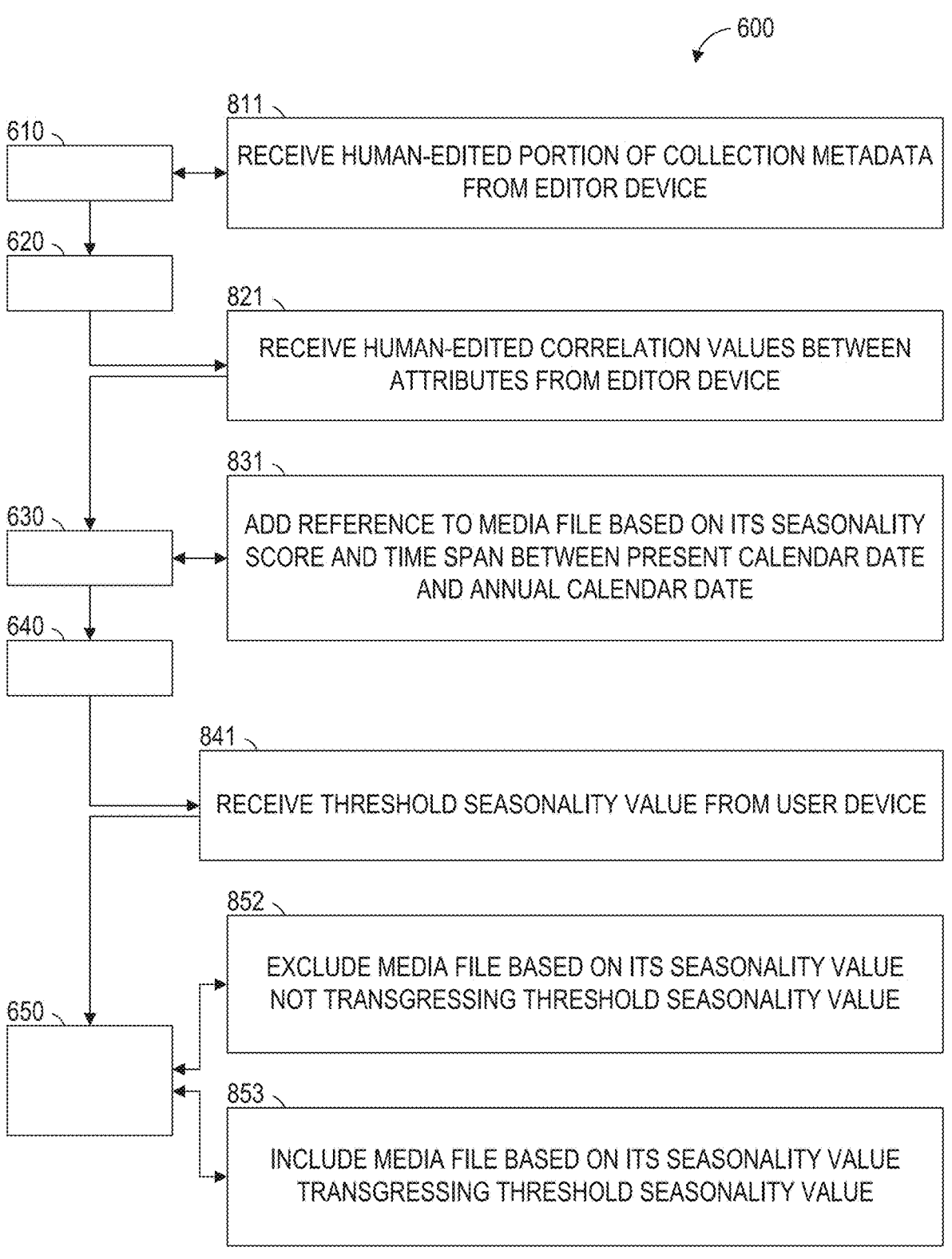

As shown in FIG. 8, the method 600 may include one or more of operations 811, 821, 831, 841, 852, and 853. Operation 811 may be performed as part of operation 610, in which the collection module 210 accesses the collection metadata 311. In some example embodiments, the collection metadata 311 is at least partially human-edited. Accordingly, in operation 811, the collection module 210 may receive a human-edited portion of the collection metadata 311 from the editor device 140. For example, the collection metadata 311 may be entirely machine-generated in its original form, and the editor 142 may utilize the editor device 140 to edit a portion of the collection metadata 311. This human-edited portion may be received in operation 811.

As shown in FIG. 8, operation 821 may be performed at any point before operation 630, in which the station module 220 may machine-generate the station set 321. In operation 821, the station module 220 receives one or more human-edited correlation values that each indicate a degree to which an attribute is correlated with another attribute. Such attributes may be specified in the collection metadata 311. For example, a received correlation value (e.g., 0.55 correlation) may indicate a degree to which a first attribute (e.g., "energetic") is correlated with a second attribute (e.g., "aggressive"). In some example embodiments, the station module 220 is configured to access a predetermined set (e.g., table) of correlation values, receive human-edited correlation values in operation 821, and perform operation 630 based on the available correlation values (e.g., predetermined, human-edited, or any suitable combination thereof).

According to various example embodiments, the collection metadata 311 may indicate for one or more media files (e.g., for each media file in the collection 310) a seasonality score that indicates a degree to which that media file is correlated with an annual calendar date (e.g., a seasonal holiday or other annual event). The seasonality score and its corresponding calendar date may form a data pair, and one or more such data pairs may be included in metadata of the media file. For example, a high seasonality score may indicate that the media file is very highly correlated with the annual calendar date (e.g., a Christmas carol being very highly correlated with December 25). As another example, low seasonality score may indicate that the media file is very weakly correlated with the annual calendar date (e.g., "The Beer Barrel Polka" being very weakly correlated with December 25). Hence, in example embodiments that include operation 841, the media server machine 110 may allow the user 152 to influence or control the seasonality of media files included in the datastream 520 (e.g., the number or frequency of highly seasonal media files streamed in the datastream 520).

As shown in FIG. 8, operation 831 may be performed as part of operation 630, in which the station module 220 may machine-generate the station set 321. In operation 831, the station set 321 is generated based on the seasonality score of a media file. For example, the station module 220 may add a reference to the media file based on its seasonality score and based on a time span between a present calendar date and the annual calendar date that corresponds to the seasonality score. This may have the effect of defining the subset 320 to include or exclude one or more media files based on their seasonality in relation to the present calendar date. For example, the subset 320 may accordingly be focused on media files having very low seasonality for the present calendar date (e.g., mostly secular songs near a religious holiday). As another example, the subset 320 may accordingly be focused on media files having very high seasonality for the present calendar date (e.g., mostly Christmas carols near Christmas).

As shown in FIG. 8, operation 841 may be performed at any point before operation 650, in which the service module 240 configures the media server machine 110 to provide the datastream 520. In operation 841, the service module 240 receives a threshold seasonality value from the user device 150 (e.g., as a submission from the user 152 or a preference of the user 152). This may have the effect of allowing the user 152 to influence or control the datastream 520 with respect to seasonality. For example, the threshold seasonality value may be a minimum seasonality score or a maximum seasonality score. In some example embodiments, operation 841 includes receiving a range of seasonality scores (e.g., both a minimum and maximum seasonality score).

As shown in FIG. 8, according to some example embodiments, operation 852 may be performed as part of operation 650, in which the service module 240 configures the media server machine 110 to provide the datastream 520. In operation 852, the service module 240 excludes (e.g., omits) a media file from the datastream 520 based on the seasonality value of the media file failing to transgress the threshold seasonality value received in operation 841. Thus, even though the media file may be included in the subset 330 (e.g., the station library, as modified in operation 640), that media file may be omitted from the provided the datastream 520 as a result of its seasonality score being too low compared to a minimum threshold seasonality value or too high compared to a maximum threshold seasonality value.

As shown in FIG. 8, according to certain example embodiments, operation 853 may be performed as part of operation 650, in which the service module 240 configures the media server machine 110 to provide the datastream 520. In operation 853, the service module 240 includes a media file and provides the media file within the datastream 520, based on the seasonality value of the media file transgressing the threshold seasonality value received in operation 841. Thus, the media file included in the subset 330 (e.g., the station library, as modified in operation 640) may be allowed to enter the datastream 520 as a result of its seasonality score being higher than a minimum threshold seasonality value or lower than a maximum threshold seasonality value.

Figure 9:
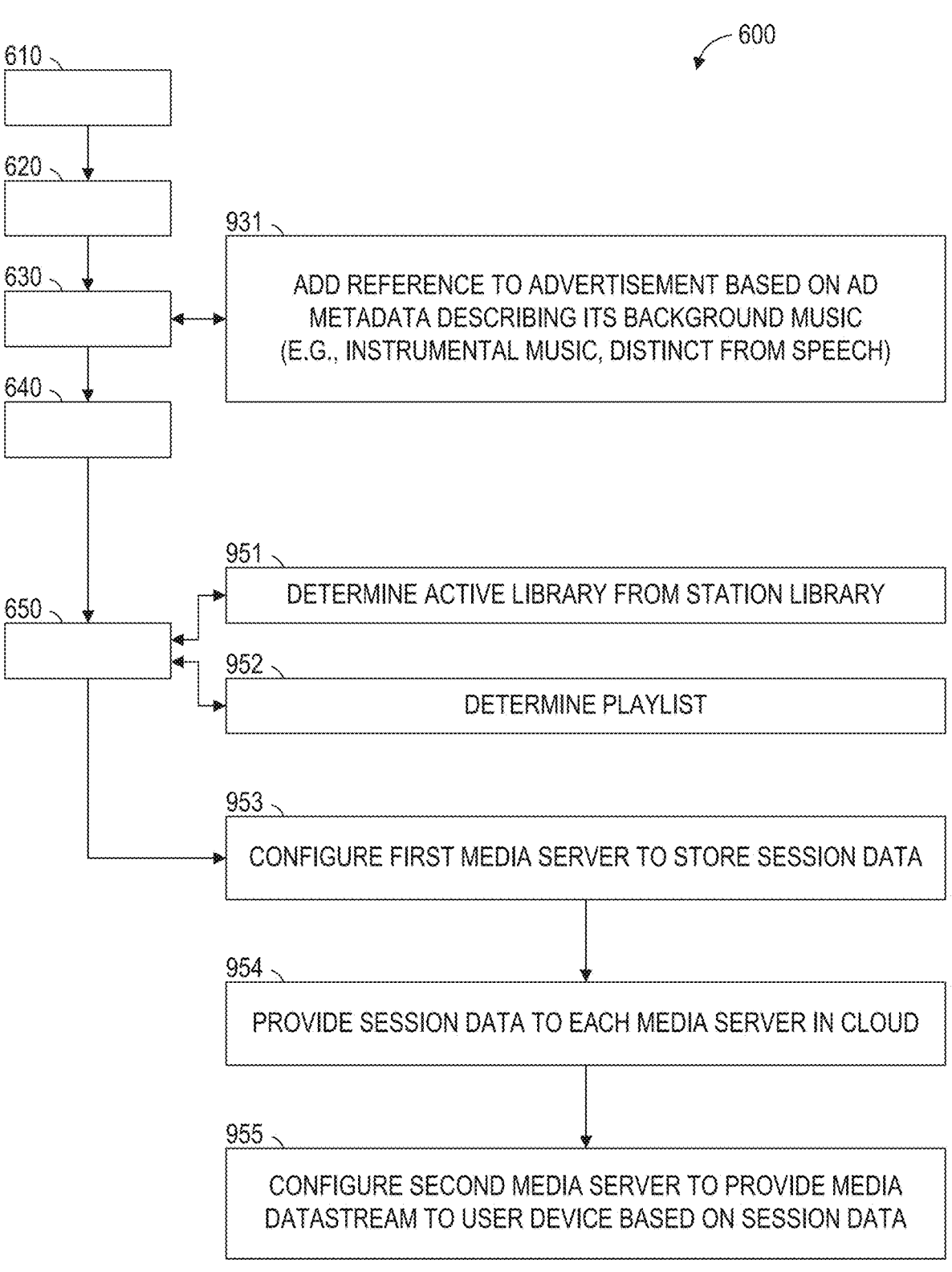

As shown in FIG. 9, the method 600 may include one or more of operations 931, 951, 952, 953, 954, and 955. In some example embodiments, the collection 310 of media files includes an advertisement (e.g., a media file whose content is an advertisement), and such an advertisement may contain music (e.g., background music, as distinguished from foreground speech) that is described by metadata (e.g., ad metadata) of the advertisement. As used herein, an "advertisement" or "ad" refers to commercial advertisements, as well as public-service announcements, infomercials, advertorials, sponsored interactive applications, or any suitable combination thereof.

The advertisement's metadata may be included in the collection metadata 311 which, as noted above, may describe all media files in the collection 310 of media files. Accordingly, operation 931 may be performed as part of operation 630, in which the station module 220 may machine-generate the station set 321. In operation 931, the station module 220 includes a reference to the advertisement (e.g., a reference to the media file whose content is the advertisement) based on an ad metadata that describes the advertisement's music. This may result in incorporating advertisements into the subset 330 (e.g., the station library) of the collection 310, based on the music that is included in such advertisements. Thus, the media service that provides the datastream 520 may include advertisements with matched music (e.g., instrumental background music) that is similar to, congruent with, or otherwise appropriate for other media files included in the datastream 520.

In some example embodiments, a selection of the advertisement they be based on an associative relationship (e.g., a human-created editorial mapping) between descriptors (e.g., attribute values) that describe the media file that contains the advertisement or its intended audience and descriptors that describe an item advertised by the advertisement (e.g., its merchandise category) or its intended audience. Such associative relations may also be weighted and may connect different attribute types to one another.

As shown in FIG. 9, one or more of operations 951 to 952 may be performed as part of operation 650, in which the service module 240 configures the media server machine 110 to provide the datastream 520 to one or more of the user devices 150 and 160. In operation 951, the service module 240 determines the portion 410 of the subset 330 (e.g., determines an active station library as a portion of the station library, as modified in operation 640). For example, the service module 240 may determine that the portion 410 is valid for a period of time (e.g., a week, two weeks, or a month) by defining the active set 411 as being valid for the same period of time. This may have the effect of determining a time-sensitive active station library exclusively from which media files may be selected for inclusion in the datastream 520. In example embodiments that include operation 951, operation 650 may include configuring of the media server machine 110 to provide only media pieces selected from the active set 411 within the datastream 520 during the period of time.

In operation 952, the service module 240 determines the portion 420 of the subset 330 (e.g., determines a play set within the station library, within the active library, or within both). As noted above, the portion 420 may be part of the portion 410 of the subset 330, part of the subset 330, or both. For example, the service module 240 may determine that the portion 420 is valid for the period of time discussed above with respect to operation 951, which may have the effect of determining a time-sensitive playlist exclusively from which media files may be selected for inclusion in the datastream 520. Operation 952 may thus include generating the playlist 421 (e.g., station playlist), which may sequentially order the portion 420 of the subset 330 of the collection 310 (e.g., by sequentially ordering a portion of the active set 411). In example embodiments that include operation 952, operation 650 may include configuring the media server machine 110 to provide only media pieces selected from the playlist 421 within the datastream 520 (e.g., during the period of time, if applicable).

As shown in FIG. 9, one or more of operations 953, 954, and 955 may be performed after operation 650, in which the service module 240 configures the media server machine 110 (e.g., a first media server). In some example embodiments, after the user device 160 stops receiving the datastream 520, the media server machine 110 saves session data that indicates portions of the datastream 520 (e.g., individual media files or portions thereof) played by the user device 160 and distributes the session data to one or more other media server machines (e.g., media server machines 120 and 130) in the network-based system 105, so that upon the user device 160 resuming reception of the datastream 520, the media server that provides the datastream 520 (e.g., media server machine 120) may provide the datastream 520 based on the session data. This may have the effect of enabling the network-based system 105 to pause and resume the datastream 520 using different (e.g., load-balanced) media server machines (e.g., media server machines 110 and 120). Accordingly, in operation 953, the service module 240 further configures the media server machine 110 (e.g., the first media server) to store the session data that indicates those portions of the datastream 520 played (e.g., presented or rendered) by the user device 160. For example, the session data may be stored in the database 115.

In operation 954, the service module 240 of the media server machine 110 (e.g., the first media server) provides the session data (e.g., accessed from the database 115) to the media server machine 120 (e.g., a second media server). This may be done as part of distributing the session data to each of multiple media server machines in the network-based system 105 (e.g., to media server machines 120 and 130).

In operation 955, the media server machine 120 (e.g., the second media server) is configured to provide the datastream 520 to the user device 160 based on the session data distributed in operation 954. In some example embodiments, the service module 240 of the media server machine 110 (e.g., the first media server) performs operation 955 by configuring the media server machine 120 (e.g., the second media server). In certain example embodiments, the media server machine 120 (e.g., the second media server) contains its own service module (e g, similar to the service module 240) that configures itself to provide the datastream 520 upon receipt of the session data distributed in operation 954.

Figure 10:
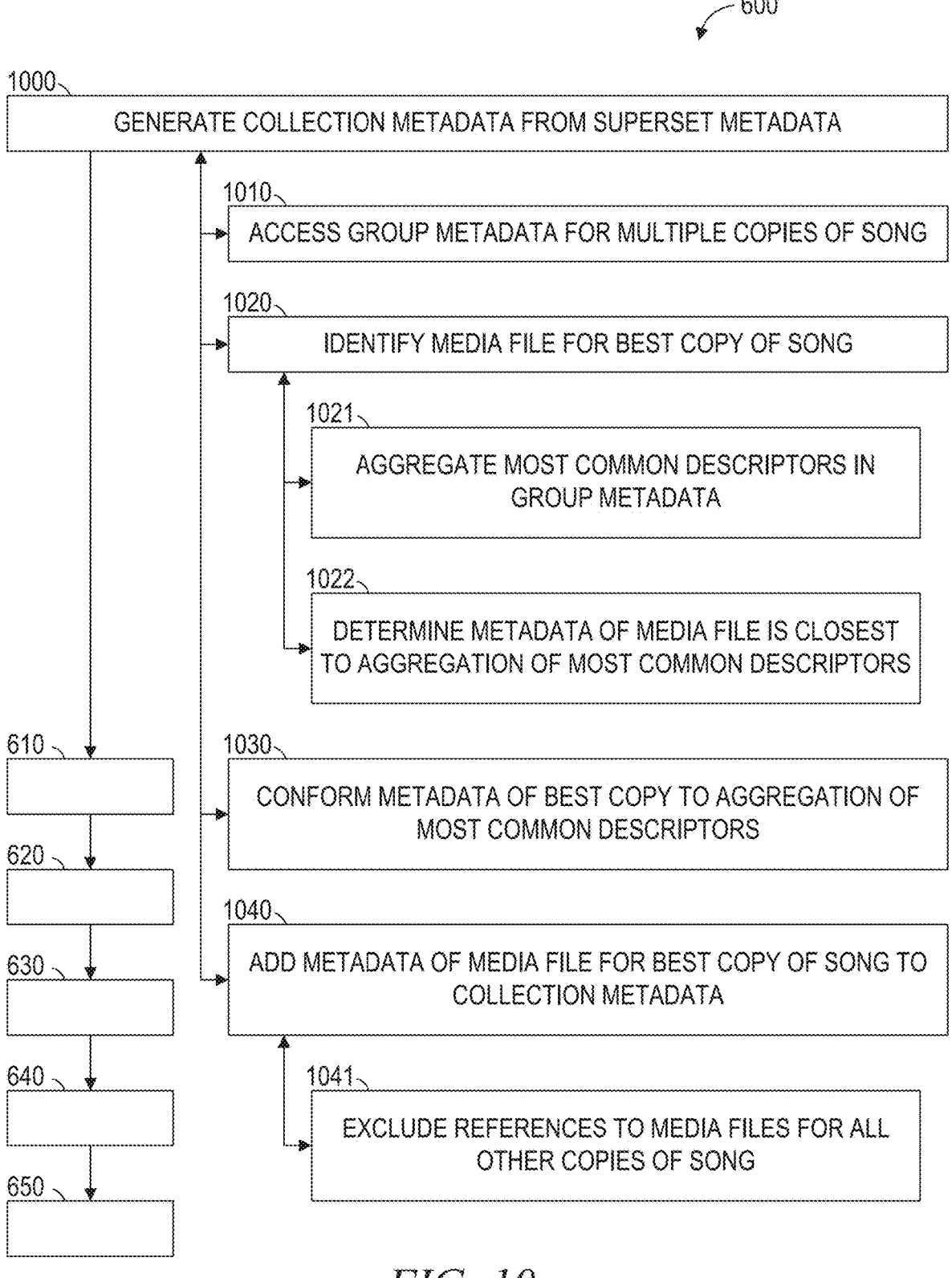

Generation of the collection metadata 311 may be performed prior to operation 610, in which the collection module 210 accesses the collection metadata 311. As shown in FIG. 10, the method 600 may include operation 1000, which may be performed at any point prior to operation 610. In operation 1000, the collection module 210 generates the collection metadata 311 from the superset metadata 301 that describes all media files available for inclusion in the collection 310 of media files. This may have the effect of defining the collection 310 of media files as a master catalog of media files, where the master catalog eliminates or minimizes duplicate instances of the same media content (e.g., the same song or video) and instead retains only most representative (e.g., best copy or best known copy) instances of that media content. Operation 1000 may include removal of media files that have extremely low popularity (e.g., as indicated by their metadata within the superset metadata 301), removal of media files with incomplete or incorrect metadata (e.g., as indicated within the superset metadata 301), removal of media files whose metadata contain one or more predetermined stop words (e.g., "karaoke," "tribute," "demo," "alternate take," "skit," "intro," or "outro"), or any suitable combination thereof.

In some example embodiments, the collection metadata 311 is generated from the superset metadata 301 through a combination of human editorial analysis, machine-based content analysis, supervised machine learning, unsupervised machine learning, data mining, and other data processing techniques. For example, since the superset metadata 301 may include metadata of the same type (e.g., music, genre, or mood) for the same media file but from different sources, confidence values or weight values may be assigned (e.g., by the editor 142) to individual sources. In some example embodiments, confidence values or weight values are assigned for individual metadata types (e.g., music, genre, or mood). Such assigned values may fully or partially determine levels of influence accorded to metadata received from different sources. In addition, the editor 142 may define one or more mappings, scaling, or biases for each source of metadata, each metadata type, or both. This may have the effect of enabling integration of multiple sources of metadata. Furthermore, the editor 142 may define one or more specificity weights for each value of a given attribute type (e.g., "neo-progressive rock" versus "rock," which may be less specific, or "dream pop" versus "indie," which may be less specific). Such specificity weights may be used to select or prioritize which values are given preference in describing a media file. Hence, according to some example embodiments, more specific attribute values (e.g., more detailed values) are given greater specificity weights, and thus receive greater preference in describing the media object and influencing calculations for operation 1000, for operation 630, or for both.

In addition, operation 1000 may include one or more of operations 1010, 1020, 1021, 1022, 1030, 1040, and 1041 to identify a most representative (e.g., best copy of a song) media file from among a group of multiple media files (e.g., multiple copies of a song). In operation 1010, the collection module 210 accesses group metadata (e.g., within the superset metadata 301) that describes the group of multiple media files (e.g., representing the multiple copies of a song). The group metadata may be accessed from the database 115. In some example embodiments, the collection module 210 also applies one or more human-curated (e.g., human-edited) heuristics or algorithms to implement basic thresholds that determine minimum acceptability of media files within the collection 310.

In operation 1020, the collection module 210 identifies a media file (e.g., one particular media file) among the group of multiple media files as the most representative (e.g., best instance or best copy) media file in the group. The most representative media file may be a most appropriate or best available instance of a recording (e.g., an audio recording or a video recording) among all instances of the recording within the superset 300 of media files. This may be performed using a combination of various techniques. According to some example embodiments, operations 1021 and 1022 may be performed as part of operation 1020. In operation 1021, the collection module 210 analyzes the group metadata and aggregates the most common descriptors (e.g., values that indicate applicability of attributes) in the group metadata. This may have the effect of compiling an aggregation of most common descriptors in the group metadata.

For example, if some of the media files for a particular song use one descriptor for an attribute (e.g., release year=2013) while other media files for the same particular song use a different descriptor for the same attribute (e.g., release year=2012), the aggregation of most common descriptors may include the most common descriptor for that attribute (e.g., corresponding to a majority or largest plurality of the media files for that song). As another example, if one media file for a given song uses a descriptor for an attribute (e.g., release year=2013) while all other media files for the same given song have no descriptor for the same attribute (e.g., release year=unknown or null value), the aggregation of most common descriptors may include the descriptor from the one media file. In this way, the aggregation of most common descriptors may represent a compilation of best available (e.g., highest voted) values for various attributes within the group metadata. Alternatively, the aggregation may be determined according to a set of heuristics capable of defining accurate value ranges for each descriptor.

According to some example embodiments, the collection module 210 weights one of more of the aggregated descriptors based on one or more additional factors. Examples of such additional factors include frequency of appearance of the descriptor (e.g., value of an attribute) among the group of multiple media files, expected values of an attribute (e.g., within an expected range of values), relative confidence or weight values associated with an aggregated descriptor (e.g., indicating reliability, accuracy, or reputation of its source), preferences for minimum or maximum values (e.g., given a set of initial candidate values), user behavior (e.g., by the users 152 and 162), user feedback (e.g., provided by the users 152 and 162), and any suitable combination thereof. Expected values of attributes may vary and may be determined based on other values that correspond to the media file.

In operation 1022, the collection module 210 determines that the metadata (e.g., first metadata) of the media file (e.g., the one particular media file) is closest to the compiled aggregation of most common descriptors. This may have the effect of identifying the media file whose metadata is the least erroneous or least incomplete among the group of multiple media files. Accordingly, this media file (e.g., a first media file) may be identified in operation 1020 as being the most representative (e.g., best copy) media file in the group.

In some example embodiments, this determination is further based on one or more additional factors, such as release type (e.g., original artist main canon, original artist compilation, various artists compilation, various artists soundtrack compilation, main artist single, or any suitable combination thereof), popularity, release year, presence of album cover art (e.g., as image data within the superset metadata 301), user behavior (e.g., by the users 152 and 162), user feedback (e.g., provided by the users 152 and 162), or any suitable combination thereof. Other examples of such additional factors include encoding bit rate, and indicated that the media file has been remastered, a number of channels (e.g., 2 audio channels or 5.1 audio channels), an indicator of audio quality, an electronic product code, an indicator of metadata quality, an indicator of editorial activity, and any suitable combination thereof. Further examples of such additional factors include the presence of a commercial identifier, an indicator of metadata language, an indicator of editorial activity, the amount of metadata for the media file (e.g., presence or absence of a value for a specific predetermined attribute), an identifier of a source of metadata for the media file. Still further examples of such additional factors include socio-cultural factors (e.g., weightings or bias) determined based on language, genre, geographical region, or any suitable combination thereof.

In operation 1030, the collection module 210 conforms the metadata (e.g., first metadata) of the media file (e.g., the first media file) to match the compiled aggregation of most common descriptors in the group metadata. This may have the effect of updating or correcting the metadata of the most representative media file based on the aggregated most common descriptors. Accordingly, the most representative media file (e.g., best available copy of a song) may be described by most representative metadata (e.g., best available metadata), which may be metadata that is determined to likely be the most accurate (e.g., have the most accurate values for each individual attribute type) associated with the media file.

In operation 1040, as part of generating the collection metadata 311 in operation 1000, the collection module 210 adds the metadata of the most representative media file (e.g., as the first metadata of the first media file) to the collection metadata 311. This may have the effect of adding the most representative media file to the collection 310 of media files. Operation 1041 may be performed as part of operation 1040. In operation 1041, the collection module 210 may exclude (e.g., omit) from the collection metadata 311 any and all references to the remaining media files in the group of multiple media files, leaving only the metadata of the most representative media file within the collection metadata 311. That is, the collection module 210 may omit all references to the multiple media files except for inclusion of the metadata (e.g., first metadata) of the most representative media file (e.g., first media file) identified in operation 1020. In some example embodiments, omission of one or more of such references may be based on a determination that the corresponding media files are unavailable (e.g., due to subscription rights, licensing contracts, territory restrictions, time-based rules for presentation of the media file, frequency-based rules for presentation of the media file, or other usage restrictions)

Alternatively, the collection module 210 may de-emphasize (e.g., de-prioritize) these references, instead of omitting them. In such alternative example embodiments, such references may be retained so that their corresponding media files are available for use as seeds (e.g., further seed metadata). Using such seeds, the editor 142, the user 152, or both, may generate additional station libraries, playlists, or any suitable combination thereof, that are linked to the most representative media file.

According to various example embodiments, one or more of the methodologies described herein may facilitate provision of one or more media services to various user devices. Moreover, one or more of the methodologies described herein may facilitate selection of advertisements for inclusion or exclusion from the media service based on their background music. Furthermore, one or more the methodologies described herein may facilitate distribution of session data that indicates plate portions of a provided datastream to multiple media server machines within a cloud-based system. In addition, one or more the methodologies described herein may identify a most representative copy of a media file and conform its metadata to an aggregation of most common descriptors found in the metadata of other copies of the media file. Hence, one or more of the methodologies described herein may facilitate provision of an enhanced media experience to one or more users.

When these effects are considered in aggregate, one or more of the methodologies described herein may obviate a need for certain efforts or resources that otherwise would be involved in providing media services and providing enhanced media experiences to users. Efforts expended by an editor in developing or approving a station library may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 11:
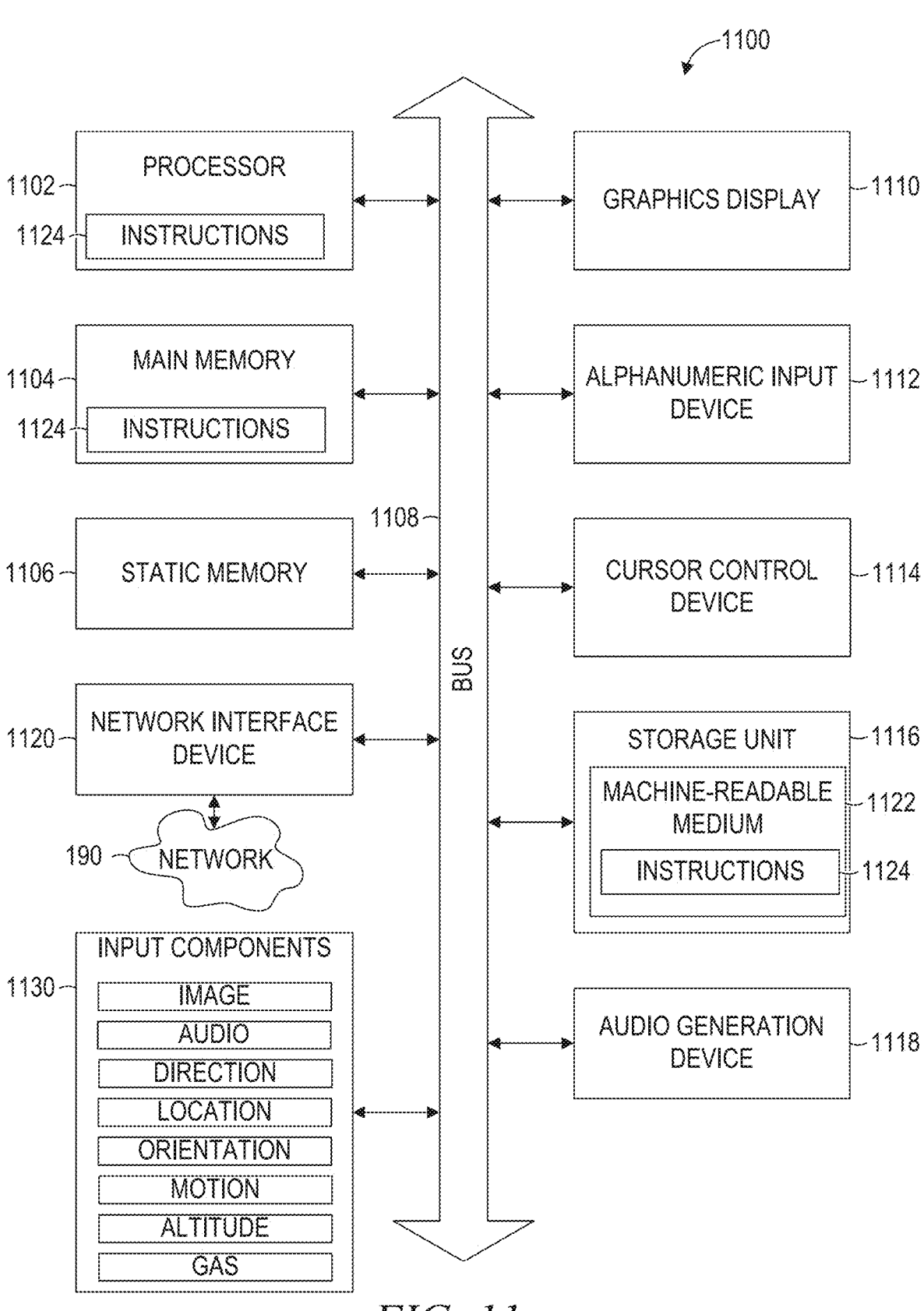
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a machine-readable storage medium, a computer-readable storage medium, or any suitable combination thereof) and perform any one or more of the methodologies discussed herein, in whole or in part. Specifically, FIG. 11 shows the machine 1100 in the example form of a computer system within which the instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Figure 12:
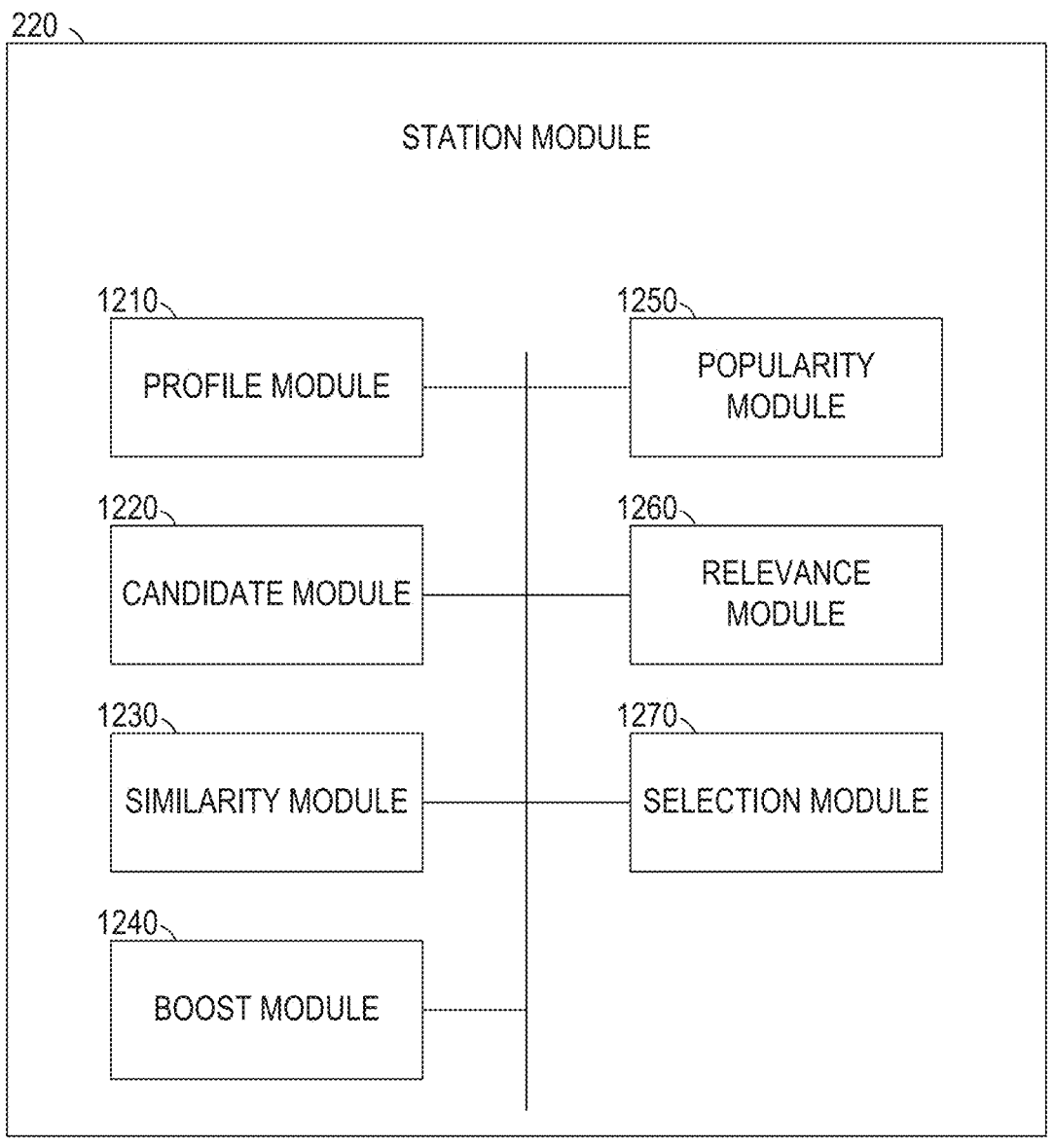
FIG. 12 is a block diagram illustrating components of a station module included in the media server machine, according to some example embodiments.

FIG. 12 is a block diagram illustrating components of the station module 220 included in the media server machine 110, according to some example embodiments. Depending on the embodiment, any one of the media server machines 110, 120 and 130 may be configured to be or include the components of the station module 220 illustrated in FIG. 12. The media server machines 110, 120, and 130 are shown as including a profile module 1210, a candidate module 1220, a similarity module 1230, a boost module 1240, a popularity module 1250, a relevance module 1260, and a selection module 1270 all configured to communicate with each other (e.g., via a bus 1108, shared memory, or a switch). Functional details of these modules are described below with respect to FIGS. 13-18. Any one or more of the modules described herein may be implemented using hardware (e.g., a processor of a machine) or a combination of hardware and software. For example, any module described herein may configure a processor 1102 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 13:
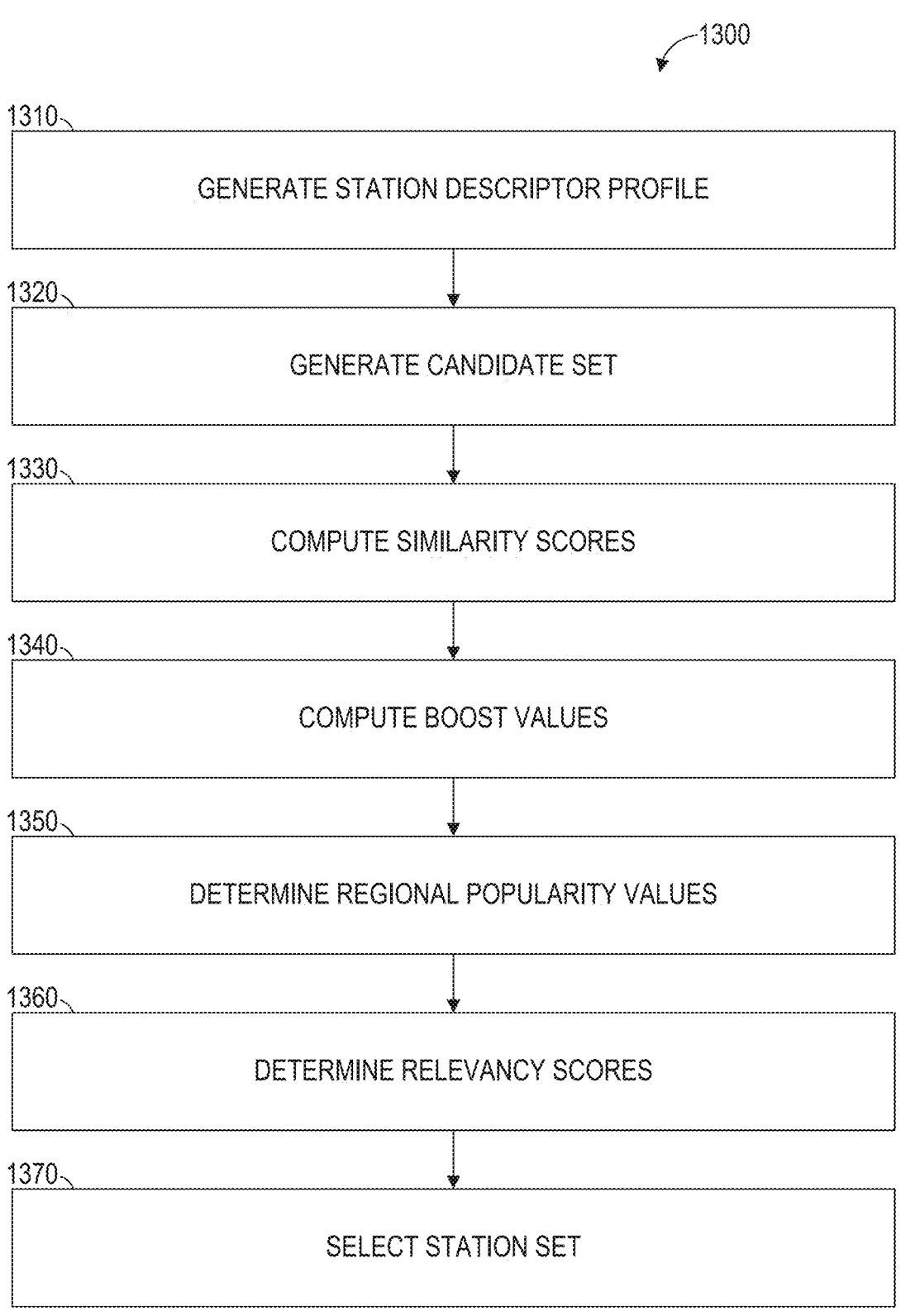
FIG. 13 is a flowchart illustrating operations of the media server machine in performing a method of machine-generating a station set defining a station library used in providing the media service, according to some example embodiments.

FIG. 13 is a flowchart illustrating operations of the media server machine in performing a method 1300 of machine-generating the station set 321 defining a station library used in providing the media service, according to some example embodiments. In some example embodiments, operations in the method 1300 may be performed as part (e.g., a precursor task, a subroutine, or a portion) of operation 620 of method 600, in which the station module 220 generates the station set 321. Operations in the method 1300 may be performed by the media server machine 110, using modules discussed above with respect to FIG. 12; accordingly, the method 1300 is described below by way of example with reference thereto. However, it shall be appreciated that the method 1300 may be deployed on various other hardware configurations and is not intended to be limited to the functional components of the station module 220 of the media server machine 110.

As noted above, the station set 321 defines a station library (e.g., a first version of the station library) by referencing each media file in the subset 320 of the collection 310. The media server machine 110 may be configured to define a station library for every artist and every media file represented in the collection 310 of media files, and the station module 220 may sequentially select each artist and each media file one by one as the seed metadata from which the station library is to be created. Accordingly, consistent with some embodiments, the method 1300 may be repeated for each artist and each media file represented in the collection 310.

In operation 1310, the profile module 1210 generates a station descriptor profile for the station set 321. The station descriptor profile is a data structure that includes information describing characteristics of the station set 321. In particular, the station descriptor profile includes information that defines a genre composition (e.g., a mixture of genres) of the station library defined by the station set 321. The station descriptor profile includes one or more focus genre profiles, each of which include a set of genre values (e.g., genre identifiers) and corresponding weights. Each genre value corresponds to a particular genre.

The profile module 1210 determines the focus genre profiles of the station descriptor profile based on the seed metadata (e.g., accessed at operation 620) describing the seed. More specifically, the candidate module 1220 determines the focus genre profiles from genre values extracted from a genre profile associated with the seed (also referred to as the "seed genre profile"). The collection metadata 311 may include a genre profile associated with each recording artist with an associated media file (e.g., artists with a recording included in a media file) in the collection 310. Each recording artist's genre profile describes the genre composition (e.g., a genre make-up) of the recording artist. As with the focus genre profile, each genre in an artist's genre profile is represented by a genre value (e.g., genre identifier). Certain recording artists may be assigned to multiple genres, and thus, genre profiles may include multiple genre values. Each genre value in the genre profile may be weighted to indicate a percentage contribution of each genre in the mix of genres assigned to the recording artist (e.g., how strongly correlated the recording artist is to a particular genre). As an example, for the recording artist David Bowie, the genre profile may include genre values corresponding to Glam, New Wave, Art Rock, Adult Alternative Rock, and Psychedelic Pop, and the genre profile may include a weight for each of the genre values to indicate a relative mix of these genres in recordings by David Bowie (e.g., 30% Glam, 20% New Wave, 20% Art Rock, 15% Adult Alternative Rock, and 15% Psychedelic Pop).

For each genre value included in the seed genre profile, the profile module 1210 creates a focus genre profile in the station descriptor profile. Each focus genre profile included in the station descriptor profile includes each of the genre values included in the seed genre profile. The profile module 1210 weights each genre value in each focus genre profile so as to emphasize the genre value for which the focus genre profile was created while maintaining the relative proportionality of the weights assigned to the remaining genre values. Following the above example, if the seed for the station set 321 is David Bowie, the profile module 1210 generates a station descriptor profile that includes a first focus genre profile corresponding to Glam, a second focus genre profile corresponding to New Wave, a third focus genre profile corresponding to Art Rock, a fourth focus genre profile corresponding to Adult Alternative Rock, and a fifth focus genre profile corresponding to Psychedelic Pop. As an example of the weightings applied to each genre value included in the focus genre profiles, the first focus genre profile may be weighted such that genre value corresponding to Glam is emphasized over the remaining genre values (e.g., 80% Glam, 6% New Wave, 6% Art Rock, 4% Adult Alternative Rock, and 3% Psychedelic Pop).

Each focus genre profile included in the station descriptor profile may provide a basis for selecting a portion of the station set 321. For example, the station module 220 may allocate a portion (e.g., a number of slots) of the station set 321 for each focus genre profile in the station descriptor profile. The size of the portion (e.g., the number of slots) in the station set 321 may be based on a combination of the number of genre values in the seed genre profile, and the weight assigned to each genre value.

In operation 1320, the candidate module 1220 generates a candidate set based on the seed metadata (e.g., describing a seed for defining a station library). The candidate set defines a subset 320 of the collection 310 from which the station set 321 may be generated. The candidate set defines the candidate subset 320 by referencing media files, referred to as "candidate media files," from the collection 310. The candidate media files included in the candidate set include media files having an associative relationship with the seed. Accordingly, the candidate module 1220 generates the candidate set by selecting media files having an associative relationship with the seed. The candidate module 1220 identifies media files with an associative relationship with the seed based on artist (e.g., recording artist) relation data (e.g., included in the seed metadata).

The artist relation data includes information regarding relationships between the artist (e.g., recording artist) corresponding to the seed (referred to hereinafter as the "seed artist") and other artists (e.g., other recording artists) associated with other media files in the superset 300 of media files. For each artist relationship, the artist relation data includes a relationship type and a weight assigned to the relationship. Relationship types include, for example, "Similar To," "Influenced By," "Followed By," "Contemporary of," "Worked with," and "Related to." Each relationship weight includes a value that provides a measure of the strength of the relationship between the two artists. For example, relationships may be assigned a weight from a scale of 1-10, where a 10 indicates that two artists are extremely related and a 1 indicates that the artists are only slightly related.

In selecting media files for inclusion in the candidate set, the candidate module 1220 selects a number of media files associated with each recording artist having a relationship (e.g., identified in the relation data) with the seed artist. The number of tracks selected from each related recording artist (e.g., a recording artist with a relationship to the seed artist) is based on the relationship type and relationship weight. In some embodiments, the candidate module 1220 determines the number of media files to select for each related artist based on information included in a look-up table, which may be stored in any one of the databases 115, 125, and 135.

In operation 1330, the similarity module 1230 computes a similarity score associated with each candidate media file referenced in the candidate set. In a sense, the similarity score associated with each candidate media file provides a measure of similarity (e.g., by virtue of shared attributes) of the candidate media file to the station descriptor profile. As an example, in computing the similarity score associated with a particular candidate media file, the similarity module 1230 may compare values representing each attribute (e.g., genre, mood, and era) of the candidate media file to values representing each corresponding attribute in the station descriptor profile. In comparing individual attribute values of the candidate media file and the station descriptor profile, the similarity module 1230 determines an attribute-level similarity score for each attribute based on the differences in respective attribute values. The attribute-level similarity score provides a measure of similarity between individual attributes of the candidate media file and the station descriptor profile. The similarity module 1230 applies a weight to each attribute-level similarity score (e.g., according to a value accessed from a look-up table) to produce weighted attribute-level similarity scores, and aggregates the weighted attribute-level similarity scores (e.g., by summing them) to generate the similarity score In some embodiments, the similarity module 1230 computes the similarity score based in part on a comparison of the genre profile component of a descriptor profile of the candidate media file (e.g., candidate metadata) with the genre profile component of the station descriptor profile. In this manner, the similarity score determined by the similarity module 1230 provides, in part, a measure of a similarity between the genre or genres associated with the station seed genre profile and the genre or genres associated with the candidate media file. Consistent with these embodiments, in computing the similarity score for the candidate media file, the similarity module 1230 determines a focus-level similarity score for each focus genre profile in the station descriptor profile based on a comparison of the genre values and weights included therein. Upon calculating the set of focus-level similarity scores (e.g., comprising a focus-level similarity score considering all descriptors for each focus genre profile), the similarity module 1230 identifies the highest value focus-level similarity score in the set, and uses this value as the similarity score for the candidate media file. The similarity module 1230 may further assign the candidate media file as a specific candidate for possible inclusion in the portion of the station set 321 allocated to the focus genre profile to which the highest value focus-level similarity score corresponds.

In operation 1340, the boost module 1240 computes one or more boost values associated with each candidate media file included in the candidate set. Boost values may be a positive or negative value that can be used by the station module 220 to emphasize or de-emphasize certain attributes or characteristics of media files included in the station set 321 by providing a basis for augmenting the similarity scores associated with candidate media files. For example, boost values may relate to a seed's language, a relationship of an artist associated with a candidate media file (hereinafter referred to as a "candidate artist") to the seed artist, a recency of a candidate media file (e.g., based on the release date of the media file relative to the current date), and collaborative filtering considerations. Accordingly, individual boost values may be calculated based on the language of the candidate media file, a relationship of the candidate artist to the seed artist (e.g., relationships such as being influenced by the seed artist, being an influencer of the seed artist, or being a contemporary of the seed artist), co-occurrences of the candidate artist and the seed artist (e.g., the candidate artist and the seed artist appearing on together in a compilation album or collaboration album), and the release date of the candidate media file, among other factors. Further details regarding the computation of boost values associated with a single candidate file, according to some example embodiments, are discussed below in reference to FIG. 15.

In operation 1350, the popularity module 1250 determines a regional popularity value associated with each candidate media file in the candidate set. Each regional popularity value represents (e.g. provides a measure of) a popularity of a candidate media file in a geographical region (e.g., country, state, or city) associated with the seed (e.g., the seed artist's geographical region of origin). The popularity module 1250 may determine a regional popularity value associated with a particular candidate media file by accessing a table that includes popularity values of the candidate media file across various geographic regions. Such information may, for example, be included in metadata describing the candidate media file (also referred to as "candidate metadata").

Individual media file popularity values included in the table may be pre-calculated by the popularity module 1250 based on a combination of various popularity metrics. For example, popularity values may be determined based on logs of user 152, 162 and machine submitted metadata look-up requests associated with a media file. Each metadata look-up request includes an identifier of the geographical region from which the request originated. Metadata look up requests may include, for example, CD metadata look up requests (e.g., user submitted recognition requests for information about CDs such as artist, track listing, and release year), media service metadata look up requests, electronic media file (e.g., MP3 files) metadata look up requests). Additionally, in determining popularity values associated with a media file, the popularity module 1250 may monitor and log electronically published global chart activity from multiple sources (e.g., Billboard® charts), each of which may be associated with a particular geographical region. In some instances, the popularity module 1250 may access legacy chart information (e.g., maintained as part of the collection metadata 311) associated with media files, which may also include popularity information associated with particular geographical regions.

The popularity module 1250 assigns a weighted value to each of the various popularity metrics (e.g., according to heuristic methods), and combines the weighted popularity metric values to compute normalized popularity values for inclusion in the table of popularity values. In an example embodiment, the popularity module 1250 may select the maximum value from the weighted popularity metric values as the popularity value. In another example embodiment, the popularity module 1250 may calculate an average of the weighted popularity metric values to determine the popularity value.

Because the popularity module 1250 calculates popularity values using popularity metrics specifically associated with particular geographic regions, the popularity values calculated by popularity module 1250 are specifically associated with the particular geographic regions associated with the popularity metrics used in the determination thereof. The popularity module 1250 may also subdivide and generate different popularity scores that are time-slice oriented. For example, the popularity module 1250 may calculate a popularity score associated with a media file for the last seven days, last 14 days, last 30 days, last 90 days, and so on.

In operation 1360, the relevance module 1260 determines a relevancy score associated with each candidate media file in the candidate set. The relevancy score provides a measure of relevancy of a particular candidate media file to the station set 321, and thus, the relevancy score provides a basis to the station module 220 for selecting candidate media files for inclusion in the station set 321. The relevance module 1260 determines the relevancy score associated with a particular candidate media file based on a combination of the similarity score, boost values, and regional popularity values associated with the candidate media file. Further details regarding the determination of a relevancy score associated with an individual candidate media file are discussed below, according to some example embodiments, in reference to FIG. 16.

In operation 1370, the selection module 1270 selects the station set 321 from the candidate set. More specifically, the selection module 1270 selects a portion (e.g., a subset 320) of the candidate media files in the candidate set as the station set 321. The selection module 1270 selects candidate media files for the station set 321 based on the relevancy score associated with each candidate media file. For example, the selection module 1270 may select a portion of candidate media file in the candidate set with the highest associated relevancy score (e.g., the top 2,000 candidate media files). Further details regarding the selection of the station set 321 from the candidate set are discussed below, according to some example embodiments, in reference to FIG. 17.

In some embodiments, the selection module 1270 selects candidate media files to populate specific portions of the station set 321 allocated to specific focus genre profiles included in the station descriptor profile. For example, as noted above, in calculating the similarity score for each candidate media file, the similarity module 1230 may designate candidate media files for consideration to be included in certain portions of the station set 321 allocated to specific focus genre profiles, and the selection module 1270 may access these designations in selecting candidate media files to populate the dedicated portions of the station set 321.

Figure 14:
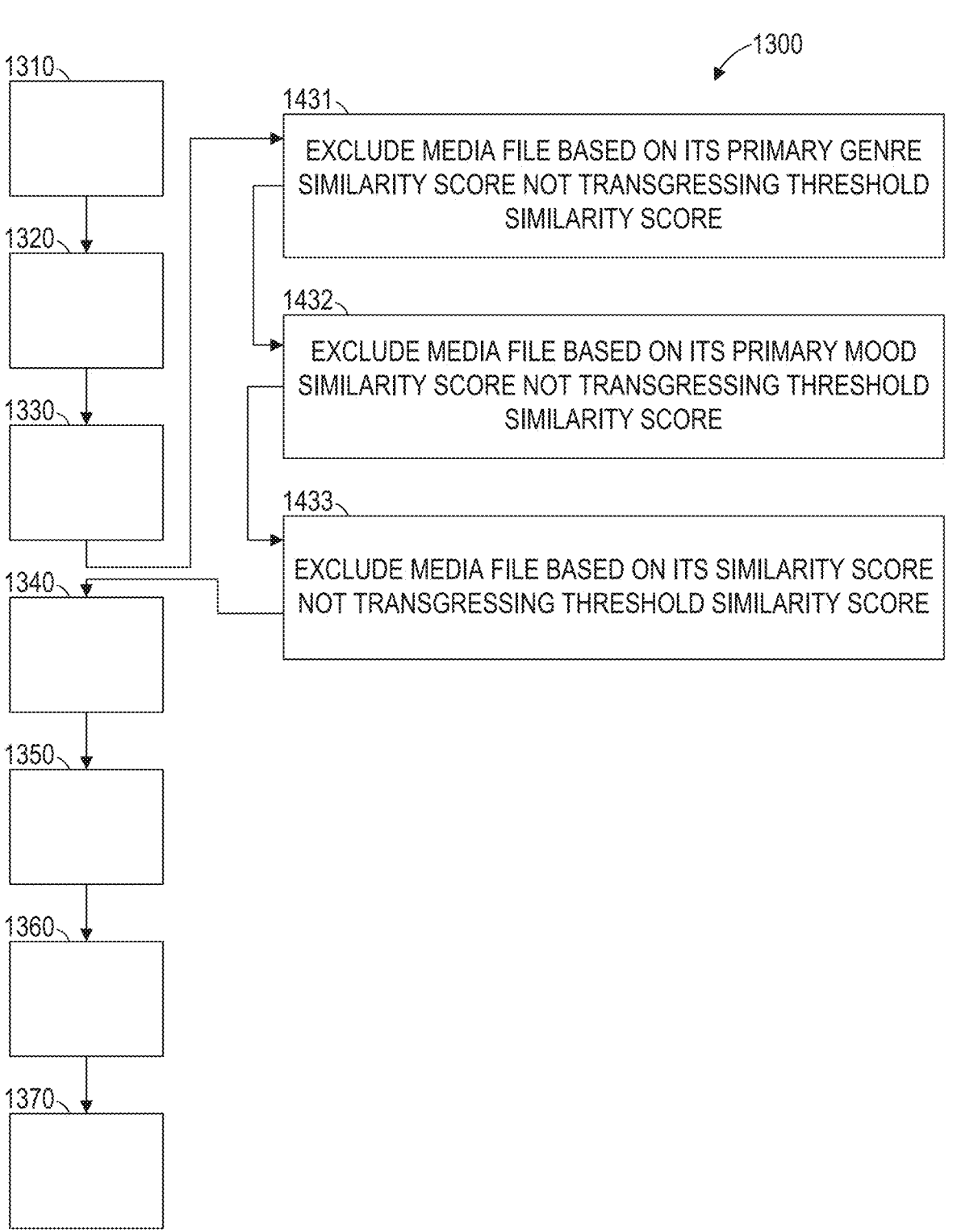
FIG. 14 is a flowchart illustrating operations of the media server machine in performing a method of generating a candidate set used in generating the station set, according to some example embodiments.

FIG. 14 is a flowchart illustrating further operations of the media server machine 110-130 in performing the method of generating a station set 321 in providing the media service, according to some example embodiments. As shown in FIG. 14, the method 1300 may include one or more of operations 1431, 1432, and 1433. As shown in FIG. 14, operations 1431-1433 may be performed after operation 1330, in which the similarity module 1230 computes similarity scores associated with each candidate media file.

In operation 1431, the candidate module 1220 excludes (e.g., omits) a media file from the candidate set based on an attribute-level similarity score of its primary genre (e.g., represented by a genre value included in metadata describing the media file) failing to transgress a threshold similarity score. Genres of each media file are described by a genre value and a weight, and the primary genre of a media file refers the genre value with the highest weight. The threshold attribute-level similarity score for the primary genre may be a default value set by an administrator of the media server machine 110, or may be received from the user device 150 (e.g., as a submission from the user 152 or a preference of the user 152), or the editor device 140 (e.g., as a submission from the human editor 142). The threshold similarity score for the primary genre may be a minimum similarity score. Thus, even though the media file may initially be included in the candidate set, that media file may be omitted from the candidate set as a result of the attribute-level similarity score for its primary genre value being too low compared to a minimum threshold similarity score.

In operation 1432, the candidate module 1220 excludes (e.g., omits) a media file from the candidate set based on an attribute-level similarity score of its primary mood (e.g., included in candidate metadata) failing to transgress a threshold similarity score. Mood characteristics of each media file (e.g., the seed or a candidate media file) are described by a mood vector comprising one or more mood values and their corresponding weight. The primary mood of a media file refers to the mood value with the highest weight. The threshold similarity score for the primary mood may be a default value set by an administrator of the media server machine 110, or may be received from the user device 150 (e.g., as a submission from the user 152 or a preference of the user 152), or the editor device 140 (e.g., as a submission from the human editor 142). The threshold similarity score for the mood value may be a minimum primary similarity score. Thus, even though the media file may initially be included in the candidate set, that media file may be omitted from the candidate set as a result of the attribute-level similarity score of its primary mood value being too low compared to a minimum threshold similarity score.

In operation 1433, the candidate module 1220 excludes (e.g., omits) a media file from the candidate set based on the similarity score of the media file failing to transgress a threshold similarity score. The threshold similarity value may be a default value set by an administrator of the media server machine 110, or may be received from the user device 150 (e.g., as a submission from the user 152 or a preference of the user 152), or the editor device 140 (e.g., as a submission from the human editor 142). The threshold similarity score may be a minimum similarity score. Thus, even though the media file may initially be included in the candidate set, that media file may be omitted from the candidate set as a result of its similarity score being too low compared to a minimum threshold similarity score.

Figure 15:
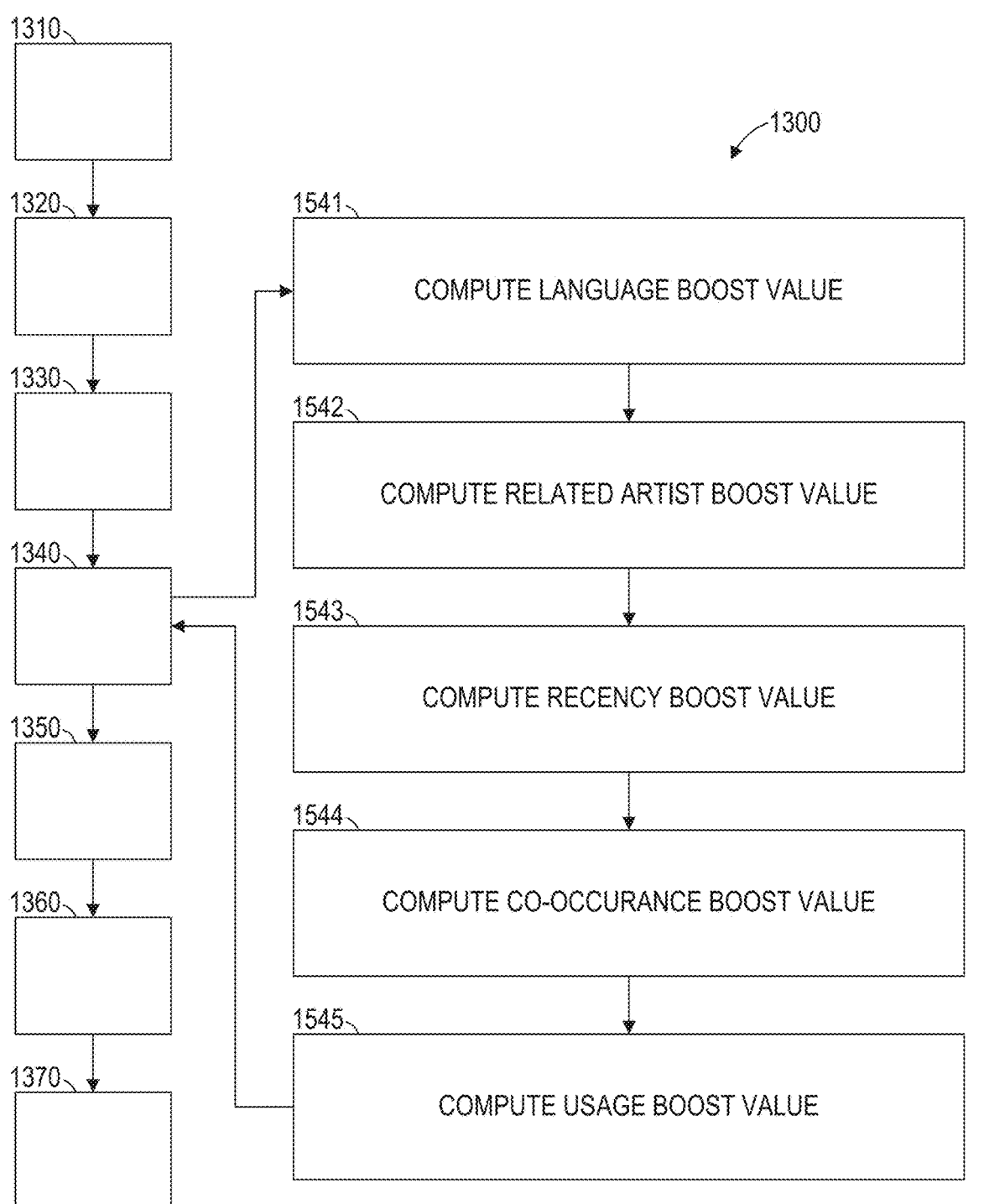
FIG. 15 is a flowchart illustrating further operations of the media server machine in performing the method of computing relevancy boost values associated with a media file, according to some example embodiments.

FIG. 15 is a flowchart illustrating further operations of the media server machine in performing the method of computing relevancy boost values associated with a media file, according to some example embodiments. As shown in FIG. 15, the method 1300 may include one or more of operations 1541-1545. More specifically, in some example embodiments, the operations 1541-1545 may be performed repeatedly as part (e.g., a precursor task, a subroutine, or a portion) of operation 1320, in which the boost module 1240 computes boost values associated with each candidate media file.

In operation 1541, the boost module 1240 computes a language boost value associated with the media file based on a language attribute included in candidate metadata (e.g., included in the collection metadata 311). More specifically, the boost module 1240 computes the language boost value based on a comparison of the language attribute of the media file with a language attribute of the seed. The boost module 1240 calculates the language boost value such that the media files of the same (or highly related) language as the seed may be scored higher than other media files. In this way, application of the language boost to the relevancy score, which is used to select the station set 321, results in a station set 321 that is more likely to be populated with media files that are of the same (or highly related) language as the seed. In some embodiments, the computing of the language boost value includes accessing an electronically stored language boost look up table populated with pre-generated language boost values.

In operation 1542, the boost module 1240 computes a related artist boost value based on artist relation data included in the collection metadata 311. More specifically, the related artist boost value is computed based on a relationship between the corresponding artist of the media file and the seed artist, which is captured in the artist relation data. As noted above, for each artist relationship, the artist relation data includes a relationship type and a weight assigned to the relationship.

The boost module 1240 computes the related artist boost value based on various combinations of the relationship type and the relationship weight. For example, the boost module 1240 may assign a high boost value to "Similar To" artists; a medium boost value to "Influenced by" and "Followed By" artists; a small boost value to "Contemporary Of" artists; and little or no boost value to "Worked With" and "Related to" artists. To further this example, the boost module 1240 may consider relationship weights to assign an extremely high boost value to "extremely similar" artists; a high boost value to "very similar" artists; a medium boost value to "solidly similar" artists; a small boost value to "somewhat similar" or "moderately similar" artists; and little or no boost value to "slightly similar" artists.

In some instances, the boost module 1240 considers directionality of similarity in determining the related artist boost. For example, the directionality of similarity may be a factor considered by the boost module 1240 to increase or decrease related artist boost value. Accordingly, consistent with some embodiments, the computing of the related artist boost value may include creating a bi-directional artist relation data set. In doing so, the boost module 1240 may analyze existing artist relation data and automatically (e.g., by an automated process of a machine) create links in the reverse direction of editorially created relationships. In creating the link in the reverse direction, the boost module 1240 may further reduce the relationship weight depending on the editorially created relationship type because similarity assignments are not necessarily bi-directional to the same degree. For example, if the relationship data indicates that Artist A is "Influenced by" Artist B with a weight value of 7, the boost module 1240 may determine that Artist B is "Followed by" Artist A with a weight value of 5.

In operation 1543, the boost module 1240 computes a recency boost value based on a temporal data (e.g., era, release year, or release date) included in candidate metadata (e.g., included in the collection metadata 311). More specifically, the boost module 1240 computes the recency boost value based on a combination of a temporal attribute associated with (e.g., era, release year, or release date) the seed artist, and a temporal attribute (e.g., era, release year, or release date) associated with the media file. In particular, in some embodiments, the boost module 1240 computes the recency boost based on a combination of: (1) an era (e.g., a time period) of the seed artist relative to the current date; and (2) a release date, year, or era associated with the media file relative to the current date. As an example, media files associated with a recent artist will be assigned a higher recency boost value than media files associated with artists from the 1950s. As another example, if the seed artist is a recent artist, media files associated with a recent artist will be assigned a higher boost than if the seed artist was an artist from the 1950s. In this way, more recent media files are assigned greater recency boost values than less recent media files, and if a seed artist is a recent artist, an even greater recency boost is assigned to recent media files.

In 1544, the boost module 1240 computes a co-occurrence boost value based on co-occurrences of the seed artist and the candidate artist. Co-occurrences of the seed artist and the candidate artist include instances in which the media file or other instances of a recording (e.g., an audio recording or a video recording) in the media file appear in albums with recordings associated with the seed artist. Accordingly, the boost module 1240 analyzes the superset metadata 301 to determine whether the media file or other instances of a recording (e.g., an audio recording or a video recording) in the media file appear in albums with recordings associated with the seed. For example, the boost module 1240 may determine through an analysis of the superset metadata 301 that a recording included in the media file is also included in a compilation album (e.g., 100 Greatest Western Swing Tracks of All Time) with a recording associated with the seed. The boost module 1240 may determine the co-occurrence boost value based on a number of co-occurrences of the seed artist and the candidate artist. Accordingly, the more frequently the media file or other instances of the recording in the media file appear in albums with recordings associated with the seed, the higher the co-occurrence boost value will be.

In 1545, the boost module 1240 computes a usage boost value based on an analysis of user activity with respect to the media file. More specifically, the media server machine 110 may monitor exchanges with the user devices 150 and 160 to maintain a log of user activity with respect the media service (also referred to as "user activity data"). Consistent with some embodiments, the user activity data may be stored in the database 115 (or other network database), and may include information related to which media files are included in each user's collections 310, access records of individual media files, and user-submitted feedback (e.g., users may provide an indication that a media file is a "Favorite") and ratings of media files. Accordingly, the usage boost value computed by the boost module 1240 may be based on any one of or a combination of a number of users 152, 162 having the media file in their collection, a number of times the media file has been accessed using the media service, a number of times the media file has been indicated as being a "Favorite," and user ratings of the media file.

Figure 16:
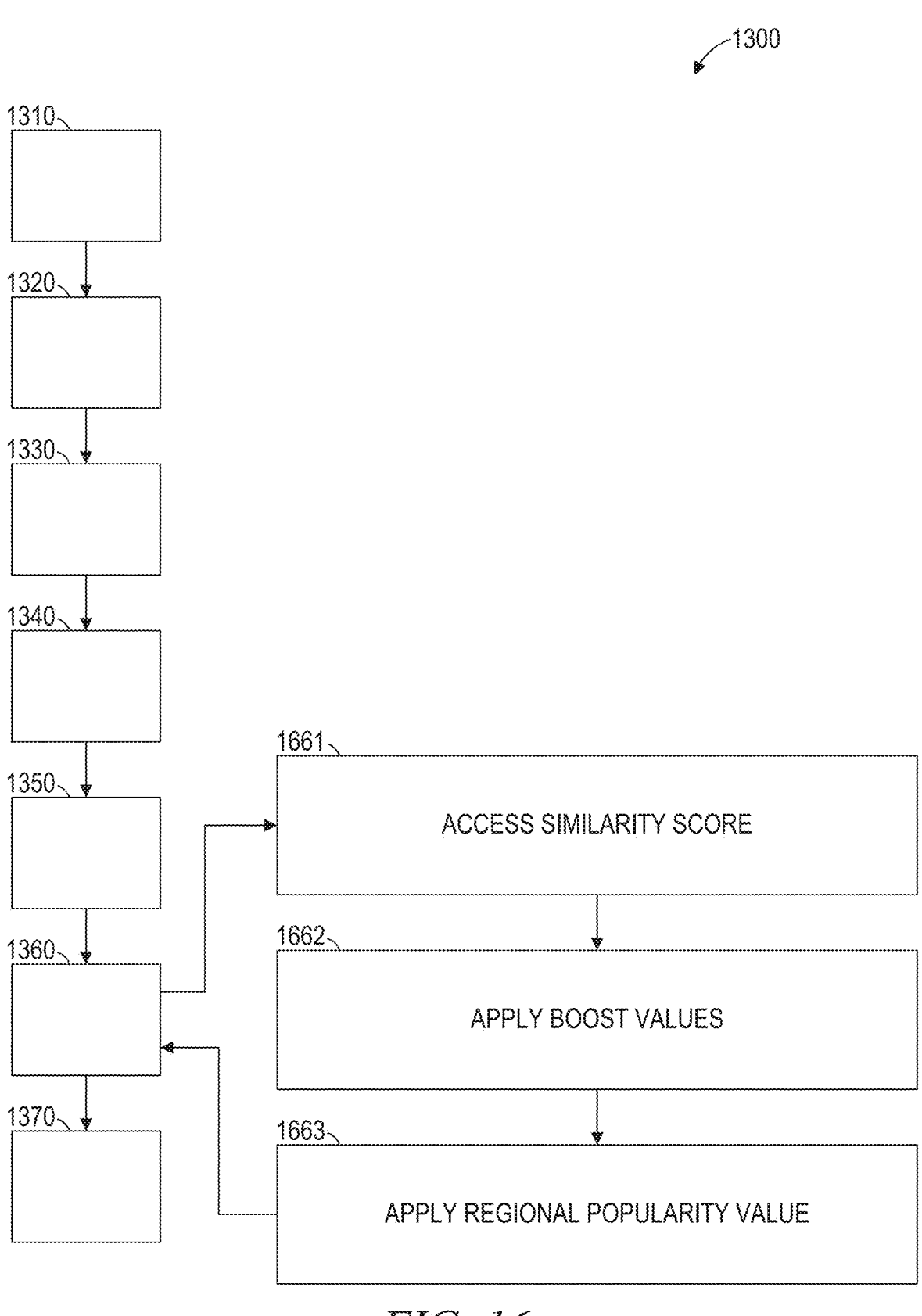
FIG. 16 is a flowchart illustrating operations of the media server machine in performing a method of computing a relevancy value associated with a media file, according to some example embodiments.

FIG. 16 is a flowchart illustrating operations of the media server machine in performing a method of computing a relevancy value associated with a media file, according to some example embodiments. As shown in FIG. 16, the method 1300 may include one or more of operations 1661-1663. More specifically, in some example embodiments, the operations 1661-1663 may be repeatedly performed as part (e.g., a precursor task, a subroutine, or a portion) of operation 1360, in which the relevance module 1260 computes relevance values associated with each candidate media file.

The similarity score associated with the media file score (e.g., determined by the similarity module 1230 at operation 1320) forms the basis for the eventually calculated relevancy value. Hence, in operation 1661, the relevance module 1260 accesses the similarity associated with the media file.

In operation 1662, the relevance module 1260 applies the one or more boost values (e.g., determined by the boost module 1240 at operation 1330) associated with the media file to the similarity score. The application of the one or more boost values to the similarity score includes performing arithmetic operations on a combination of the one or more boost values and the similarity score. For example, in some embodiments, the application of the one or more boost values to the similarity score includes summing the similarity score and the one or more boost values. Accordingly, in instances in which an individual boost value is positive, the application of the boost value to the similarity score results in an increase to the value thereof, and conversely, in instances in which an individual boost value is positive, the application of the boost value to the similarity score results in a decrease to the value thereof. In other embodiments, the application of the one or more boost values includes multiplying the similarity score by the one or more boost value.

In operation 1663, the relevance module 1260 applies the regional popularity value (e.g., determined by the popularity module 1250 at operation 1340) to the combination of the one or more boost values and the similarity score. As with the application of the one or more boost values, the application of the regional popularity value to the combination of the one or more boost values and the similarity score includes performing arithmetic operations on a combination of the regional popularity value, the one or more boost values, and the similarity score. For example, in some embodiments, the application of the regional popularity values to the combination of the one or more boost values to the similarity score includes summing the similarity score, the one or more boost values, and the regional popularity score. In other embodiments, the application of the regional popularity values to the combination of the one or more boost values to the similarity score includes taking a percentage of the regional popularity score based on the overall popularity of the seed and summing it with the similarity score and the one or more boost values. The result of the application of the popularity value to the combination of the one or more boost values and the similarity score is the relevancy score.

Figure 17:
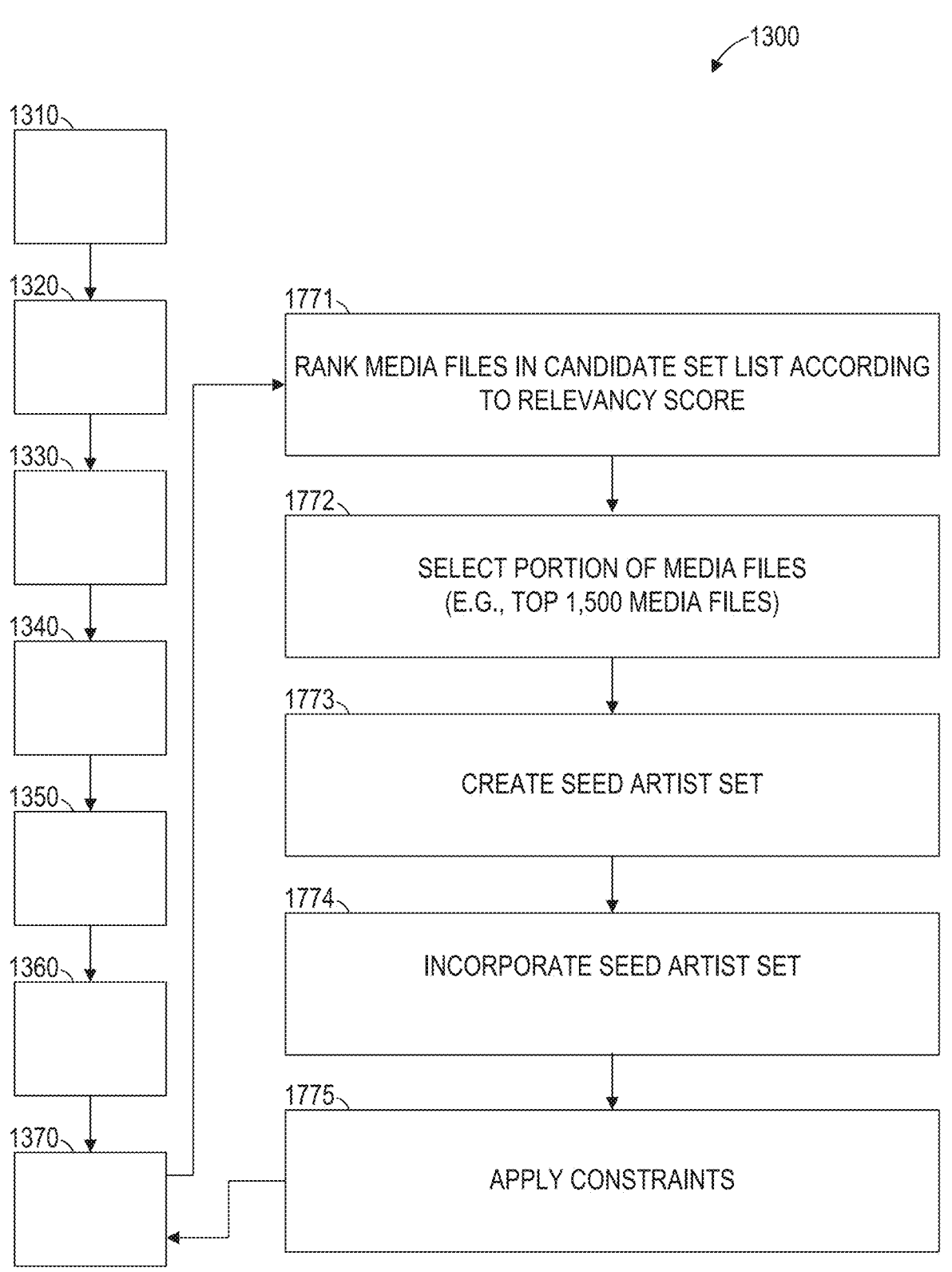
FIG. 17 is a flowchart illustrating further operations of the media server machine in performing the method of generating a station set used in providing the media service, according to some example embodiments.

FIG. 17 is a flowchart illustrating further operations of the media server machine in performing the method of generating a station set 321 used in providing the media service, according to some example embodiments. As shown in FIG. 17, the method 1300 may include one or more of operations 1771-1775. More specifically, in some example embodiments, the operations 1771-1775 may be performed as part (e.g., a precursor task, a subroutine, or a portion) of operation 1370, in which the selection module 1270 selects candidate media files for inclusion in the station set 321. Further, consistent with some embodiments, the operations 1771-1775 may be performed for each focus genre profile in the station descriptor profile such that each dedicated portion of the station set 321 (e.g., allocated for specific focus genre profiles) is individually populated with candidate media files in a manner according to the operations of 1771-1775.

In operation 1771, the selection module 1270 sorts the candidate set according to the relevance score (e.g., determined by the relevance module 1260 at operation 1350) associated with each media file referenced therein. For example, the selection module 1270 may sort the candidate set such that the candidate media files are arranged in descending order according to relevancy score.

In operation 1772, the selection module 1270 selects a portion of the candidate media files from the candidate set based on the relevance score associated with each media file. For example, the selection module 1270 may select the portion of candidate media files in the candidate set with the highest associated relevancy scores (e.g., the 1,500 highest ranked media files according to relevancy score). The selected candidate media files are included in the station set 321.

In operation 1773, the selection module 1270 creates a seed artist set. The seed artist set defines a subset 320 of the collection 310 that comprises media files including recordings of the recording artist associated with the seed. The seed artist set defines the subset 320 by referencing media files, referred to as "seed artist media files," from the collection 310. In creating the seed artist set, the candidate module 1220 identifies media files from the collection 310 that include recordings from the seed artist (e.g., recording artist associated with the seed), and selects a representative portion of the recordings that reflects the full scope of the seed artist's repertoire. Accordingly, the selection of seed artist media files may be based on the relative mix of genre values (e.g., based on percentage of weight) included in a genre profile included in metadata that describes the seed artist.

In operation 1774, the selection module 1270 incorporates the seed artist set into the station set 321. In incorporating the seed artist set into the station set 321, the selection module 1270 modifies the station set 321 to include references to the seed artist media files included in the seed artist set.

At operation 1775, the selection module 1270 applies one or more constraints to the station set 321. The constraints may include default constraints set by an administrator of the media server machine 110, user constraints received from the user device 150 (e.g., as a submission from the user 152 or a preference of the user 152), or editor constraints received from the editor device 140 (e.g., as a submission from the human editor 142). The constraints may, for example, include a constraint on a number of media files that include recordings from a particular recording artist, a constraint on a number of media files that include recordings associated with a particular genre or mood, a constraint on a number of media files that include recordings from a particular era, or any other constraints related to media file attributes included in the station set 321. Accordingly, applying a constraint to the station set 321 may include removing one or more media files from the station set 321 to satisfy the constraint.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing collection metadata that describes media files included within a collection of media files;
accessing seed metadata, the seed metadata being a basis on which a first subset of the collection of media files is to be defined;
machine-generating, using a processor, a station set from the collection metadata based on the seed metadata, the machine-generated station set defining a station library by defining the first subset of the collection and referencing each media file in the first subset, wherein a boost value determined for each media file in the collection of media files augments a similarity score associated with the corresponding media file, wherein the boost value determined for each media file is based on at least one of (i) a relationship between an artist for the media file and a seed artist included in the collection metadata, or (ii) co-occurrences of the artist for the media file and the seed artist, wherein the corresponding media file is defined to be in the first subset of the collection based on the augmented similarity score;
modifying the machine-generated station set based on a human-contributed input received from an editor device, the modified station set modifying the station library by defining a second subset of the collection and referencing each media file in the second subset; and
configuring a media server to stream to a user device a media datastream that comprises media files selected from the second subset defined by the modified machine-generated station set, wherein the editor device comprises a first computer system, wherein the user device comprises a second computer system, wherein the user device is distinct from the editor device.

2. The method of claim 1, wherein:
the media files include audio files; and
the configuring of the media server configures a network radio service that streams the audio files to the user device.

3. The method of claim 1, wherein:
the media files include video files; and
the configuring of the media server configures a network video service that streams the video files to the user device.

4. The method of claim 1, wherein modifying the station library comprises removing one or more media files from the first subset.

5. The method of claim 1, wherein modifying the station library comprises adding one or more media files to the first subset.

6. The method of claim 1, wherein the collection metadata indicates for at least one media file a seasonality score of a given media file, the seasonality score indicating a level of correlation of the media file with an annual calendar date, and wherein machine-generating the station set comprises, based the seasonality score and a comparison of the annual calendar date with a present calendar date, controlling whether to include given media file in the first subset.

7. A computing system comprising:
at least one processor comprising microcircuits;
non-transitory machine-readable storage;
instructions stored in the non-transitory machine-readable storage for causing the at least one processor to carry out operations including:
accessing collection metadata that describes media files included within a collection of media files;
accessing seed metadata, the seed metadata being a basis on which a first subset of the collection of media files is to be defined;
machine-generating, using a processor, a station set from the collection metadata based on the seed metadata, the machine-generated station set defining a station library by defining the first subset of the collection and referencing each media file in the first subset, wherein a boost value determined for each media file in the collection of media files augments a similarity score associated with the corresponding media file, wherein the boost value determined for each media file is based on at least one of (i) a relationship between an artist for the media file and a seed artist included in the collection metadata, or (ii) co-occurrences of the artist for the media file and the seed artist, wherein the corresponding media file is defined to be in the first subset of the collection based on the augmented similarity score;
modifying the machine-generated station set based on a human-contributed input received from an editor device, the modified station set modifying the station library by defining a second subset of the collection and referencing each media file in the second subset; and
configuring a media server to stream to a user device a media datastream that comprises media files selected from the second subset defined by the modified machine-generated station set, wherein the editor device comprises a first computer system, wherein the user device comprises a second computer system, wherein the user device is distinct from the editor device.

8. The computing system of claim 7, wherein:
the media files include audio files; and
the configuring of the media server configures a network radio service that streams the audio files to the user device.

9. The computing system of claim 7, wherein:
the media files include video files; and
the configuring of the media server configures a network video service that streams the video files to the user device.

10. The computing system of claim 7, wherein modifying the station library comprises removing one or more media files from the first subset.

11. The computing system of claim 7, wherein modifying the station library comprises adding one or more media files to the first subset.

12. The computing system of claim 7, wherein the collection metadata indicates for at least one media file a seasonality score of a given media file, the seasonality score indicating a level of correlation of the media file with an annual calendar date, and wherein machine-generating the station set comprises, based the seasonality score and a comparison of the annual calendar date with a present calendar date, controlling whether to include given media file in the first subset.

13. A non-transitory machine-readable storage medium comprising instructions that, when executed by one or more processors of a machine, cause the machine to perform operations comprising:

accessing collection metadata that describes media files included within a collection of media files;

accessing seed metadata, the seed metadata being a basis on which a first subset of the collection of media files is to be defined;

machine-generating a station set from the collection metadata based on the seed metadata, the machine-generated station set defining a station library by defining the first subset of the collection and referencing each media file in the first subset, wherein a boost value determined for each media file in the collection of media files augments a similarity score associated with the corresponding media file, wherein the boost value determined for each media file is based on at least one of (i) a relationship between an artist for the media file and a seed artist included in the collection metadata, or (ii) co-occurrences of the artist for the media file and the seed artist, wherein the corresponding media file is defined to be in the first subset of the collection based on the augmented similarity score;

modifying the machine-generated station set based on a human-contributed input received from an editor device, the modified station set modifying the station library by defining a second subset of the collection and referencing each media file in the second subset; and configuring a media server to stream to a user device a media datastream that comprises media files selected from the second subset defined by the modified machine-generated station set, wherein the editor device comprises a first computer system, wherein the user device comprises a second computer system, wherein the user device is distinct from the editor device.

14. The non-transitory machine-readable storage medium of claim 13, wherein:

the media files include audio files; and the configuring of the media server configures a network radio service that streams the audio files to the user device.

15. The non-transitory machine-readable storage medium of claim 13, wherein:

the media files include video files; and the configuring of the media server configures a network video service that streams the video files to the user device.

16. The non-transitory machine-readable storage medium of claim 13, wherein modifying the station library comprises at least one of removing one or more media files from the first subset or adding one or more media files to the first subset.

17. The non-transitory machine-readable storage medium of claim 13, wherein the collection metadata indicates for at least one media file a seasonality score of a given media file, the seasonality score indicating a level of correlation of the media file with an annual calendar date, and wherein machine-generating the station set comprises, based the seasonality score and a comparison of the annual calendar date with a present calendar date, controlling whether to include given media file in the first subset.

18. The method of claim 1, wherein the media datastream includes the selected media files in a sequential order for playout by the user device, the method further comprising structuring the sequential order of the selected media files to cause playout of one or more of the selected media files to occur early in the sequential order based on the one or more selected media files being possessed by a user of the user device.

19. The computing system of claim 7, wherein the media datastream includes the selected media files in a sequential order for playout by the user device, the operations further comprising structuring the sequential order of the selected media files to cause playout of one or more of the selected media files to occur early in the sequential order based on the one or more selected media files being possessed by a user of the user device.

20. The non-transitory machine-readable storage medium of claim 13, wherein the media datastream includes the selected media files in a sequential order for playout by the user device, the operations further comprising structuring the sequential order of the selected media files to cause playout of one or more of the selected media files to occur early in the sequential order based on the one or more selected media files being possessed by a user of the user device.

* * * * *